United States Patent
Nakamura et al.

(10) Patent No.: US 11,349,572 B2
(45) Date of Patent: May 31, 2022

(54) OPTICAL TRANSMISSION SYSTEM, OPTICAL TRANSMITTING APPARATUS, AND OPTICAL RECEIVING APPARATUS

(71) Applicant: NIPPON TELEGRAPH AND TELEPHONE CORPORATION, Tokyo (JP)

(72) Inventors: Masanori Nakamura, Tokyo (JP); Seiji Okamoto, Tokyo (JP); Etsushi Yamazaki, Tokyo (JP); Yoshiaki Kisaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/056,409

(22) PCT Filed: May 8, 2019

(86) PCT No.: PCT/JP2019/018388
§ 371 (c)(1),
(2) Date: Nov. 17, 2020

(87) PCT Pub. No.: WO2019/225311
PCT Pub. Date: Nov. 28, 2019

(65) Prior Publication Data
US 2021/0367675 A1 Nov. 25, 2021

(30) Foreign Application Priority Data
May 22, 2018 (JP) .............................. JP2018-098279

(51) Int. Cl.
*H04B 10/50* (2013.01)
*H04B 10/69* (2013.01)
(Continued)

(52) U.S. Cl.
CPC ............. *H04B 10/50* (2013.01); *H04B 10/69* (2013.01); *H04N 19/103* (2014.11); *H04N 19/129* (2014.11)

(58) Field of Classification Search
CPC ............................... H04B 10/50; H04B 10/69
(Continued)

(56) References Cited

U.S. PATENT DOCUMENTS 6,161,209 A * 12/2000 Moher .............. H03M 13/2963
714/795
7,421,138 B2 * 9/2008 Van Der Vleuten ........................
H03M 7/4006
341/107
(Continued)

FOREIGN PATENT DOCUMENTS

JP        2014107734 A *  6/2014  ......... H04B 10/2543

OTHER PUBLICATIONS

F. Buchali et al., Experimental demonstration of capacity increase and rate-adaptation by probabilistically shaped 64-QAM, ECOC (2015).
(Continued)

*Primary Examiner* — Abbas H Alagheband
(74) *Attorney, Agent, or Firm* — Harness, Dickey & Pierce, P.L.C.

(57) ABSTRACT

An optical communication system is provided in which a serial/parallel converting unit outputs bit sequences of sequence groups a number of which is determined by a logarithmic value and a bit sequence of a highest-order sequence group, a converting unit converts the bit sequence of the sequence group input to the converting unit into a bit sequence for which a probability of occurrence of 0 or a probability of occurrence of 1 is a predetermined probability of occurrence, a selecting unit acquires a bit sequence for
(Continued)

which the probability of occurrence is converted by a converting unit higher in order than the converting unit for the selecting unit, and selects an order of output of a symbol to other selecting units in the sequence groups higher in order than the selecting unit in accordance with the acquired bit sequence, a multiplication unit multiplies a value representing the symbol selected by a highest-order selecting unit, by a number in accordance with the bit sequence of the highest order sequence group, a transmission unit transmits an optical signal based on a result of the multiplication by the number, an optical receiver includes a reception unit and a demodulation unit, and the reception unit receives the optical signal, and performs demodulation processing.

7 Claims, 14 Drawing Sheets

(51) Int. Cl.
H04N 19/129 (2014.01)
H04N 19/103 (2014.01)

(58) Field of Classification Search
USPC .......................................................... 398/43
See application file for complete search history.

(56) References Cited

U.S. PATENT DOCUMENTS

| | | | |
|---|---|---|---|
| 7,693,429 B1* | 4/2010 | Lowery | H04B 10/548 398/192 |
| 9,960,789 B2* | 5/2018 | Nakamura | H03M 13/256 |
| 10,523,400 B2* | 12/2019 | Lefevre | H04L 1/0061 |
| 11,012,187 B1* | 5/2021 | Kim | H04L 1/0047 |
| 11,038,596 B2* | 6/2021 | Tehrani | H04B 10/504 |
| 2003/0202612 A1* | 10/2003 | Halder | H03H 17/0288 375/265 |
| 2004/0005012 A1* | 1/2004 | Suzuki | H03M 13/3905 375/262 |
| 2012/0314867 A1* | 12/2012 | Tomaru | H04L 9/0858 380/270 |
| 2013/0019084 A1* | 1/2013 | Orchard | G06K 9/74 712/222 |
| 2017/0064321 A1* | 3/2017 | Kashyap | H04N 19/91 |
| 2018/0070106 A1* | 3/2018 | Han | H04N 19/134 |
| 2019/0052873 A1* | 2/2019 | Kang | H04N 19/103 |
| 2019/0132182 A1* | 5/2019 | Lu | H04L 27/362 |
| 2019/0268598 A1* | 8/2019 | Chiang | H04N 19/18 |
| 2020/0295872 A1* | 9/2020 | Yan | H04L 1/0071 |
| 2021/0336733 A1* | 10/2021 | Yoshida | H04L 25/49 |

OTHER PUBLICATIONS

G. Böcherer et al., High throughput probabilistic shaping with product distribution matching, IEEE, 2017.

M. Pikus et al., Bit-level probabilistically shaped coded modulation, IEEE Communications Letters, vol. 21, No. 9, 2017.

T. V. Ramabadran, A coding scheme for m-out-of-n codes, IEEE Transactions on Communications, vol. 38, No. 8, 1990.

* cited by examiner

US 11,349,572 B2

OPTICAL TRANSMISSION SYSTEM, OPTICAL TRANSMITTING APPARATUS, AND OPTICAL RECEIVING APPARATUS

CROSS-REFERENCE TO RELATED APPLICATIONS

This application is a 371 National Stage of International Application No. PCT/JP2019/018388 filed on May 8, 2019, which claims priority to Japanese Patent Application No. 2018-098279, filed May 22, 2018. The entire disclosures of the above applications are incorporated herein by reference.

TECHNICAL FIELD

The present invention relates to an optical communication system, an optical transmitter, and an optical receiver.

BACKGROUND ART

For an increased optical transmission distance, attention has been paid to a modulation technique that heterogenizes the distribution of the probability of occurrence of symbols in a plane (IQ plane) including an in-phase (In-phase) axis and a quadrature phase (Quadrature) axis) (see NPL 1) (hereinafter referred to as "heterogenization modulation technology"). An optical transmitter that performs modulation processing such as 64 QAM (64 Quadrature Amplitude Modulation) selects a symbol for an optical signal to be transmitted to heterogenize the distribution of the probabilities of occurrence of symbols in the IQ plane. Here, the optical transmitter reduces transmission power for the optical signal by selecting the symbols such that the probability of occurrence of a symbol having a small amplitude is higher than the probability of occurrence of a symbol having a large amplitude. In this way, the optical transmitter can reduce a signal to noise power ratio.

In NPL 1, the optical transmitter heterogenizes the probabilities of occurrence of the symbols in units of symbols (symbol level). However, in a high throughput environment as required for optical communication systems, parallel processing that performs heterogenization of the probabilities of occurrence in units of symbols is difficult. Thus, a matching circuit that performs the heterogenization of the probability of occurrence in units of bits (bit level) has been proposed (see NPLs 2 and 3).

Additionally, an entropy conversion circuit has been proposed that outputs a bit sequence (code word) corresponding to an input bit sequence on a one-to-one basis (see NPL 4). The entropy conversion circuit outputs a bit sequence of the Hamming weight, which corresponds to the number of is included in the bit sequence input to the entropy conversion circuit.

CITATION LIST

Non Patent Literature

NPL 1: F. Buchali et al., "Experimental demonstration of capacity increase and rate-adaptation by probabilistically shaped 64-QAM." ECOC (2015)

NPL 2: Georg Bocherer et al., "High Throughput Probabilistic Shaping Product Distribution Matching"

NPL 3: Marcin Pikus et al., "Bit-Level Probabilistically Shaped Coded Modulation"

NPL 4: T. V. Ramabadran, "A Coding Scheme for m-out-of-n Codes" IEEE Transactions on communications, Vol. 38 No. 8 (1990)

SUMMARY OF THE INVENTION

Technical Problem

FIG. 18 is a diagram illustrating an example of a configuration of a modulation unit of an optical transmitter in the related art. The conventional modulation unit includes a serial/parallel converting unit, a first converting unit (first entropy conversion circuit), a second converting unit (second entropy conversion circuit), a binary gray converting unit, and a bit symbol converting unit.

The serial/parallel converting unit acquires, for example, a bit sequence (random bit sequence) of 0 and 1 having a sequence length of 100 bits. FIG. 18 shows an example of a configuration of a 64-QAM modulation unit. In this case, the serial/parallel converting unit outputs the most-significant bit sequence in an input bit sequence to the bit symbol converting unit as a Most Significant Bit (MSB) bit sequence. The serial/parallel converting unit outputs the second-significant bit sequence in the input bit sequence to the first converting unit as a Second Significant Bit (SSB) bit sequence. The serial/parallel converting unit outputs the least-significant bit sequence in the input bit sequence to the second converting unit as a Least Significant Bit (LSB) bit sequence. In 256 QAM having a higher multivalue level than 64 QAM, the serial/parallel converting unit outputs Third Significant Bits (TSBs) between the SSBs and the LSBs. Additionally, in a case of $2^{(2 \times M)}$ (M is an integer of 2 or greater) QAM, the serial/parallel converting unit outputs M bit sequences from the first bit sequence to the M-th bit sequence in response to a random bit sequence input to the serial/parallel converting unit. The following is an example of 64 QAM (where M=3).

The sequence length of each bit sequence output by the serial/parallel converting unit is predetermined. Specifically, in the output of the serial/parallel converting unit, the sequence length of the MSB bit sequence, the sequence length of the SSB bit sequence, and the sequence length of the LSB bit sequence are each predetermined. Here, the sequence length of the MSB bit sequence is equal to or greater than the sequence length of the SSB bit sequence and the sequence length of the LSB bit sequence.

The first converting unit is an entropy conversion circuit that converts the SSB bit sequence input to the first converting unit into an SSB bit sequence in which the probability of occurrence of 0 or the probability of occurrence of 1 is a predetermined probability of occurrence. The SSB bit sequence subjected to an entropy conversion and output from the first converting unit has a sequence length equal to or greater than the sequence length of the SSB bit sequence input to the first converting unit. The probability of occurrence of 0 or the probability of occurrence of 1 in the SSB bit sequence subjected to the entropy conversion is predetermined to be any probability of occurrence. The first converting unit outputs, to the binary gray converting unit, the SSB bit sequence subjected to the entropy conversion and corresponding to the SSB bit sequence input to the first converting unit on a one-to-one basis.

In FIG. 18, Pin1(0), which is the probability of occurrence of 0 in the bit sequence input to the first converting unit, is 0.5 as an example. Pin1(1), which is the probability of occurrence of 1 in the bit sequence input to the first converting unit, is 0.5 as an example. An entropy H is expressed as "Σ·P·log (P)". Thus, an input entropy Hin is 1.

Pout1(0), which is the probability of occurrence of 0 in the SSB bit sequence subjected to the entropy conversion and output from the first converting unit, is 0.7 as an example. Pout1(1), which is the probability of occurrence of 1 in the SSB bit sequence subjected to the entropy conversion and output from the first converting unit, is 0.3 as an example. Thus, an output entropy Hout is 0.88.

The second converting unit is an entropy conversion circuit that converts the LSB bit sequence input to the second converting unit into an LSB bit sequence in which the probability of occurrence of 0 or the probability of occurrence of 1 is a predetermined probability of occurrence. The LSB bit sequence subjected to the entropy conversion and output from the second converting unit has a sequence length equal to or greater than the sequence length of the LSB bit sequence input to the second converting unit. The probability of occurrence of 0 or the probability of occurrence of 1 in the LSB bit sequence subjected to the entropy conversion is predetermined to be any probability of occurrence. The second converting unit outputs, to the binary gray converting unit, an LSB bit sequence subjected to the entropy conversion and corresponding to the LSB bit sequence input to the second converting unit on a one-to-one basis.

The binary gray converting unit couples the SSB bit sequence output from the first converting unit and the LSB bit sequence output from the second converting unit such that the SSB bit sequence is at a higher level than the LSB bit sequence. The binary gray converting unit converts binary codes resulting from the coupling into gray codes.

The binary gray converting unit outputs the result of the gray code conversion to the bit symbol converting unit as bit sequences of the SSBs and the LSBs subjected to the gray code conversion. Here, the MSB bit sequence output by the serial/parallel converting unit, the SSB bit sequence output by the binary gray converting unit, and the LSB bit sequence output by the binary gray converting unit have an equal sequence length. For example, in 64 ($=8^2$) QAM, the sequence length of gray codes of symbols is 6 ($=2 \times \log_2 8$) bits.

In a more general configuration (other multi-value level), outputs from M-1 entropy conversion circuits are input to the binary gray converting unit, and the binary gray converting unit converts the binary codes into gray codes in units of M-1 bits.

FIG. 19 is a diagram illustrating an example of a relationship between gray codes of symbols and the probabilities of occurrence of the symbols in the related art illustrated in FIG. 18. In $N^2$ QAM, bits of a sequence length representing symbols ($2 \times \log_2 N$) are divided into ($\log_2 N$) bits corresponding to the I axis and ($\log_2 N$) bits corresponding to the Q axis, and the probabilities of occurrence of the symbols are controlled on at least one of the I and Q axes. Then, the probabilities of occurrence of the symbols in a quadrant of an IQ plane can be controlled according to a distance (amplitude) from the origin. In a case where the distribution of the probabilities of occurrence of the symbols in the IQ plane is symmetric with respect to the positive and negative of the amplitude value, in 64 ($=8^2$) QAM, the MSBs need not be considered as long as each of a set of 3 SSBs and a set of 3 LSBs ($=\log_2 8$) is considered on each of the I and Q axes.

In a conventional optical communication system, the ratio between Psym(a), which is the probability of occurrence of a symbol a, and Psym(b), which is the probability of occurrence of a symbol b, is equal to the ratio between Psym(c), which is the probability of occurrence of a symbol c, and Psym(d), which is the probability of occurrence of a symbol d. Thus, the conventional optical communication system involves a constraint on the ratio of Psym, which is the probability of occurrence of each symbol, as described above, and thus precludes the Psym for each symbol from being independently determined. In other words, in the conventional optical communication system, the distribution of the probabilities of occurrence of the symbols in the IQ plane cannot be arbitrarily adjusted simply by manipulating the probability of occurrence of 0 or the probability of occurrence of 1 in the SSB and LSB independently. This also applies to the case where the multi-value level is higher. In a case of $2^{(2 \times M)}$ QAM, a constraint occurs when the probability of occurrence of $2^{(M-1)}$ symbol points is set.

The above-described constraint precludes the conventional configuration from setting an arbitrary distribution. For example, it is known that, for achievement of communication capacity to a theoretical limit in an environment of Additive White Gaussian Noise (AWGN), the distribution of the probabilities of occurrence of the symbols needs to comply with the "Maxwell-Bortzmann Distribution". Transmission loss occurs in optical communication systems in which the distribution of the probabilities of occurrence of the symbols does not comply with the "Maxwell-Boltzmann Distribution". In this way, the conventional optical communication system may fail to arbitrarily adjust the probabilities of occurrence of the symbols by using a simple configuration.

In light of the foregoing, an object of the present disclosure is to provide an optical communication system, an optical transmitter, and an optical receiver that can arbitrarily adjust the probabilities of occurrence of symbols by using a simple configuration.

Means for Solving the Problem

An aspect of the present invention is an optical communication system including an optical transmitter and an optical receiver. The optical transmitter includes a serial/parallel converting unit, converting units and selecting units the numbers of which correspond to a logarithmic value for the number of candidates for a symbol having different probabilities of occurrence, a multiplication unit, and a transmission unit. The serial/parallel converting unit outputs bit sequences of sequence groups the number of which is determined by the logarithmic value and a bit sequence of a highest-order sequence group. Each of the converting units converts the bit sequence of the sequence group input to the converting unit into a bit sequence for which a probability of occurrence of 0 or a probability of occurrence of 1 is a predetermined probability of occurrence. Each of the selecting units acquires a bit sequence for which the probability of occurrence is converted by the converting unit higher in order than the converting unit for the selecting unit, and selects an order of output of the symbol to other selecting units in the sequence groups higher in order than the selecting unit in accordance with the acquired bit sequence. The multiplication unit multiplies a value representing the symbol selected by a highest-order selecting unit of the selecting units, by a number, in accordance with the bit sequence of the highest order sequence group. The transmission unit transmits an optical signal based on a result of the multiplication by the number. The optical receiver includes a reception unit and a demodulation unit. The reception unit receives the optical signal. The demodulation unit performs demodulation processing on an electrical signal generated in accordance with the received optical signal.

An aspect of the present invention is the above-described optical communication system in which the optical transmitter includes two modulation units each including the converting unit, the selecting unit, and the multiplication unit, an imaginary-number converting unit, and a multiplexing unit. The imaginary-number converting unit converts a sequence of the symbols of real numbers output from a first modulation unit of the modulation units into a sequence of the symbols of imaginary numbers. The multiplexing unit multiplexes a sequence of the symbols of real numbers output from a second modulation unit of the modulation units and the sequence of the symbols of imaginary numbers.

An aspect of the present invention is an optical transmitter including a serial/parallel converting unit, converting units and selecting units the numbers of which correspond to a logarithmic value for the number of candidates for a symbol having different probabilities of occurrence, a multiplication unit, and a transmission unit. The serial/parallel converting unit outputs bit sequences of sequence groups the number of which is determined by the logarithmic value and a bit sequence of a highest-order sequence group. Each of the converting units converts the bit sequence of the sequence group input to the converting unit into a bit sequence for which a probability of occurrence of 0 or a probability of occurrence of 1 is a predetermined probability of occurrence. Each of the selecting units acquires a bit sequence for which the probability of occurrence is converted by the converting unit higher in order than the converting unit for the selecting unit, and selects an order of output of the symbol to other selecting units in the sequence groups higher in order than the selecting unit in accordance with the acquired bit sequence. The multiplication unit multiplies a value representing the symbol selected by a highest-order selecting unit of the selecting units, by a number, in accordance with the bit sequence of the highest order sequence group. The transmission unit transmits an optical signal based on a result of the multiplication by the number.

An aspect of the present invention is the above-described optical transmitter that includes two modulation units each including the converting unit, the selecting unit, and the multiplication unit; an imaginary-number converting unit; and a multiplexing unit. The imaginary-number converting unit converts a sequence of the symbols of real numbers output from a first modulation unit of the modulation units into a sequence of the symbols of imaginary numbers. The multiplexing unit multiplexes a sequence of the symbols of real numbers output from a second modulation unit of the modulation units and the sequence of the symbols of imaginary numbers.

An aspect of the present invention is the above-described optical transmitter in which the selecting unit selects a symbol for an optical signal to be transmitted from a plurality of candidates for the symbol arranged in a two-dimensional complex plane in an amplitude direction.

An aspect of the present invention is the above-described optical transmitter in which the multiplication unit multiplies, by a real number, a value representing the symbol for the optical signal to be transmitted.

An aspect of the present invention is an optical receiver including a reception unit that receives an optical signal transmitted from the optical transmitter; and a demodulation unit that performs demodulation processing on an electrical signal generated in accordance with the optical signal.

Effects of the Invention

According to the present disclosure, the probabilities of occurrence of symbols can be arbitrarily adjusted by using a simple configuration.

DESCRIPTION OF EMBODIMENTS

Embodiments of the present invention will be described in detail with reference to the drawings.

First Embodiment

Figure 1:
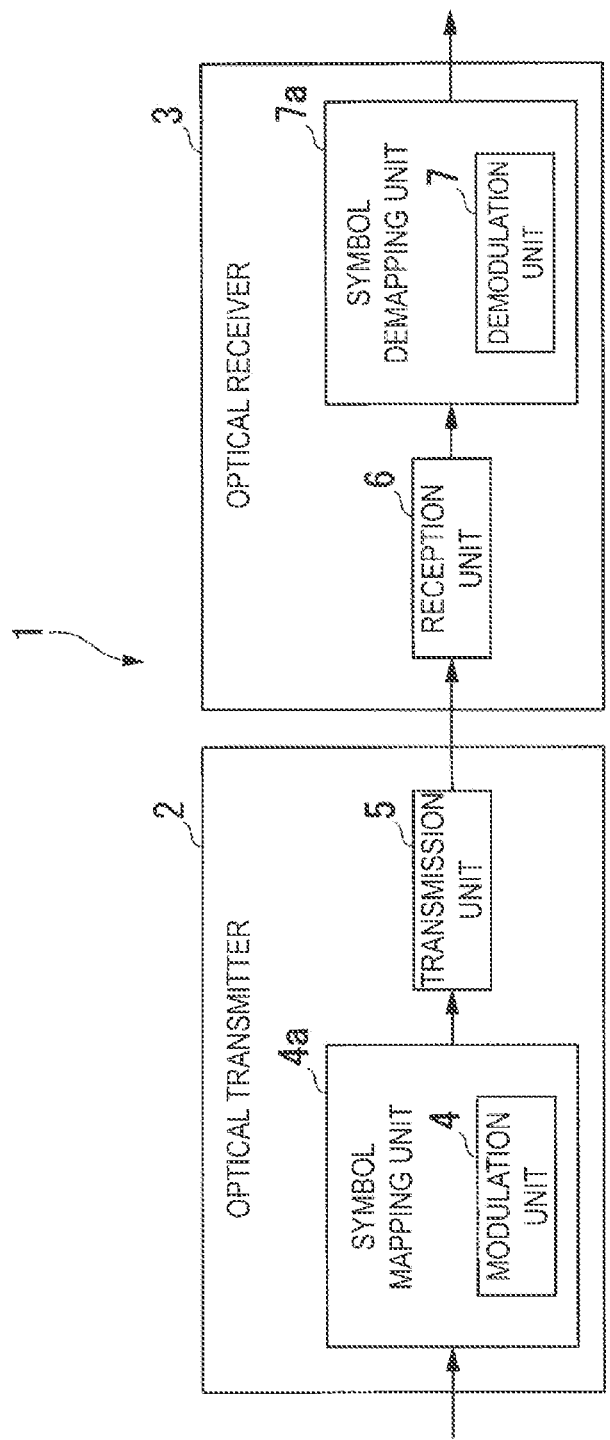
FIG. 1 is a diagram illustrating an example of a configuration of an optical communication system according to a first embodiment.

FIG. 1 is a diagram illustrating an example of a configuration of an optical communication system 1 (an optical transmission system). The optical communication system 1 includes an optical transmitter 2 (an optical transmitting apparatus) and an optical receiver 3 (an optical receiving apparatus). The optical transmitter 2 is a device that transmits an optical signal. The optical transmitter 2 includes a symbol mapping unit 4a and a transmission unit 5. The symbol mapping unit 4a includes a modulation unit 4. The modulation unit 4 selects a symbol for an optical signal to be transmitted by performing modulation processing on a bit sequence input to the modulation unit 4. The transmission unit 5 generates an optical signal in accordance with an electrical signal representing the selected symbols. The transmission unit 5 transmits the generated optical signal to the optical receiver 3 via a transmission line such as an optical fiber.

The optical receiver 3 is a device that receives an optical signal. The optical receiver 3 includes a reception unit 6 and a symbol demapping unit 7a. The reception unit 6 receives an optical signal from the transmission unit 5. The reception unit 6 generates an electrical signal representing symbols in accordance with the received optical signal. The symbol demapping unit 7a includes a demodulation unit 7. The demodulation unit 7 performs demodulation processing on the electrical signal generated by the reception unit 6. The demodulation unit 7 outputs, to a predetermined external device, a bit sequence on which demodulation processing has been performed.

Now, a configuration example of the modulation unit 4 and the demodulation unit 7 will be described in detail.

Figure 2:
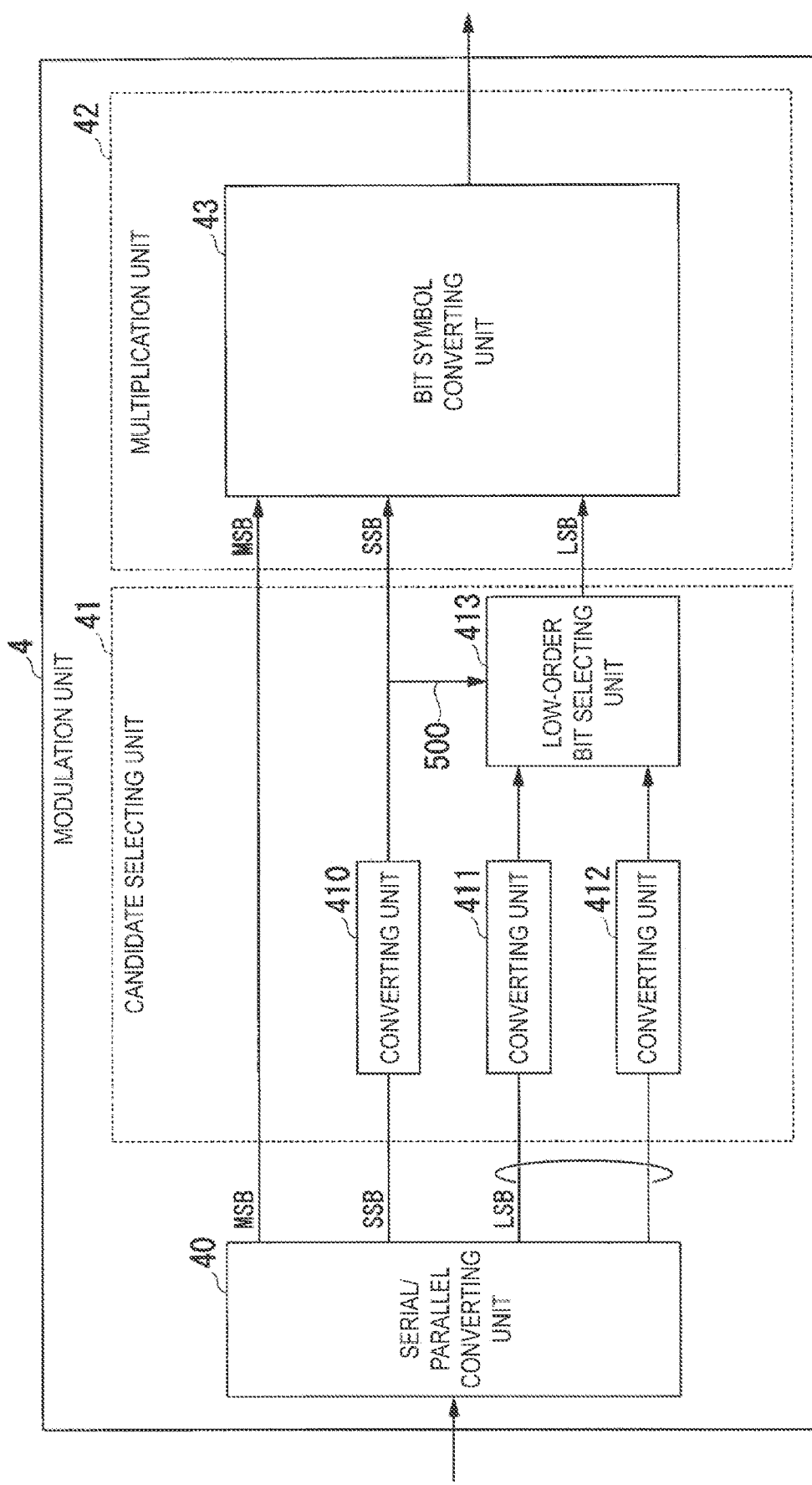
FIG. 2 is a diagram illustrating an example of a configuration of a 64-QAM modulation unit according to the first embodiment.

FIG. 2 is a diagram illustrating an example of a configuration of the modulation unit 4 for 64 QAM. The modulation unit 4 for 64 QAM includes a serial/parallel converting unit 40, a candidate selecting unit 41 (a selector), a multiplication unit 42, and a signal line 500. The candidate selecting unit 41 includes a converting unit 410, a converting unit 411, and a converting unit 412. The multiplication unit 42 includes a bit symbol converting unit 43. The signal line 500 outputs a bit sequence of SSBs subjected to an entropy conversion by the converting unit 410 from the converting unit 410 to a low-order bit selecting unit 413.

Figure 3:
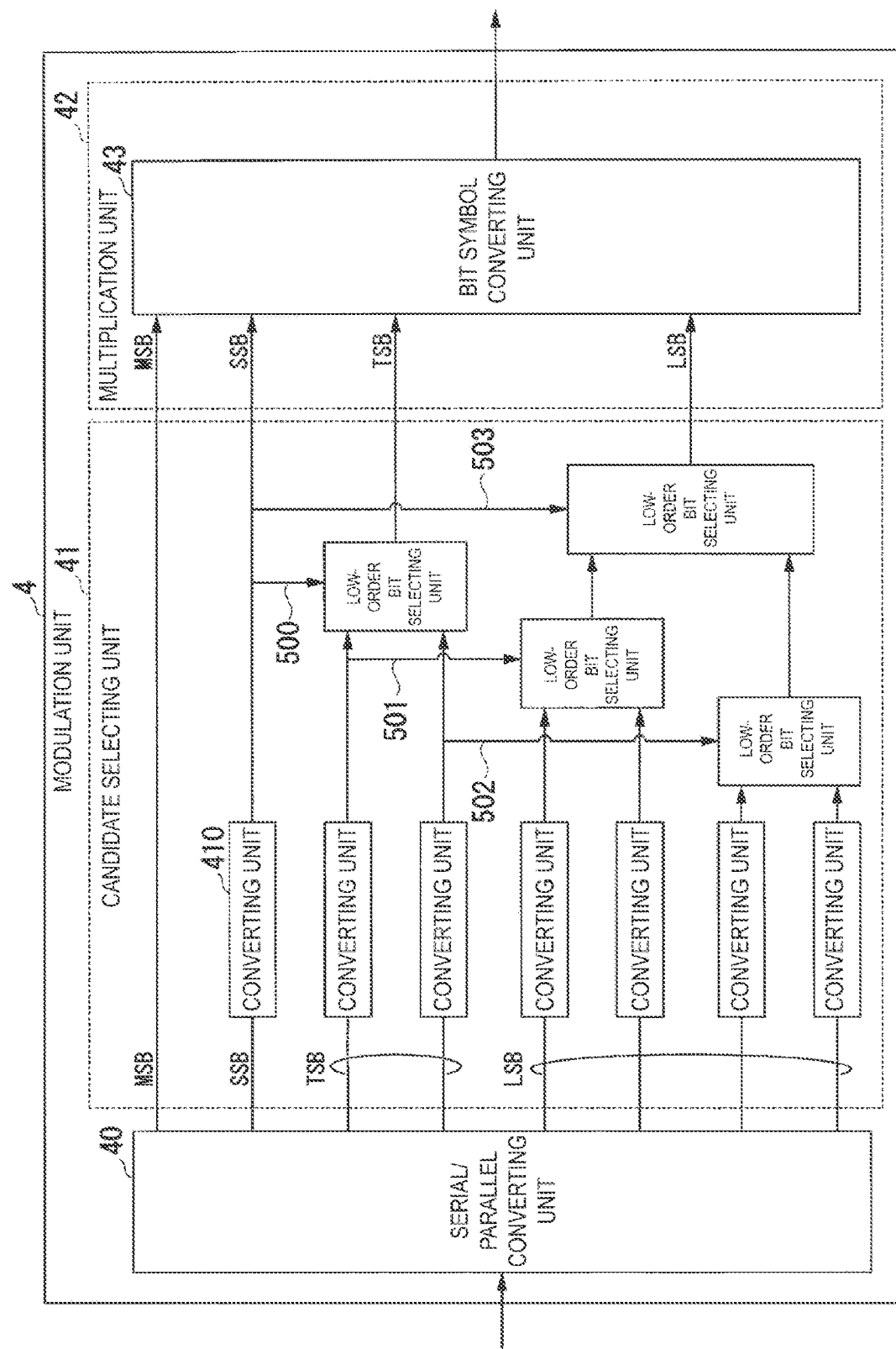
FIG. 3 is a diagram illustrating an example of a configuration of a 256-QAM modulation unit according to the first embodiment.

FIG. 3 is a diagram illustrating an example of a configuration of the modulation unit 4 for 256 QAM. The modulation unit 4 for 256 QAM includes a serial/parallel converting unit 40, a candidate selecting unit 41, a multiplication unit 42, and signal lines 500 to 503. The serial/parallel converting unit 40 outputs a first TSB bit sequence and a second TSB bit sequence between the SSBs and the LSBs.

The signal line 500 outputs an SSB bit sequence subjected to the entropy conversion to a low-order bit selecting unit to which the first TSB bit sequence and the second TSB bit sequence are input. The signal line 501 outputs the first TSB bit sequence subjected to the entropy conversion to a low-order bit selecting unit to which a first LSB bit sequence and a second LSB bit sequence are input. The signal line 502 outputs the second TSB bit sequence subjected to the entropy conversion to a low-order bit selecting unit into which a third LSB bit sequence and a fourth LSB bit sequence are input. The signal line 503 outputs an SSB bit sequence output from the converting unit 410 to a low-order bit selecting unit for the LSBs.

By thus adding the converting units and the bit selecting units to the modulation unit 4, the modulation unit 4 for $2^{(2 \times M)}$ QAM can be represented.

Figure 4:
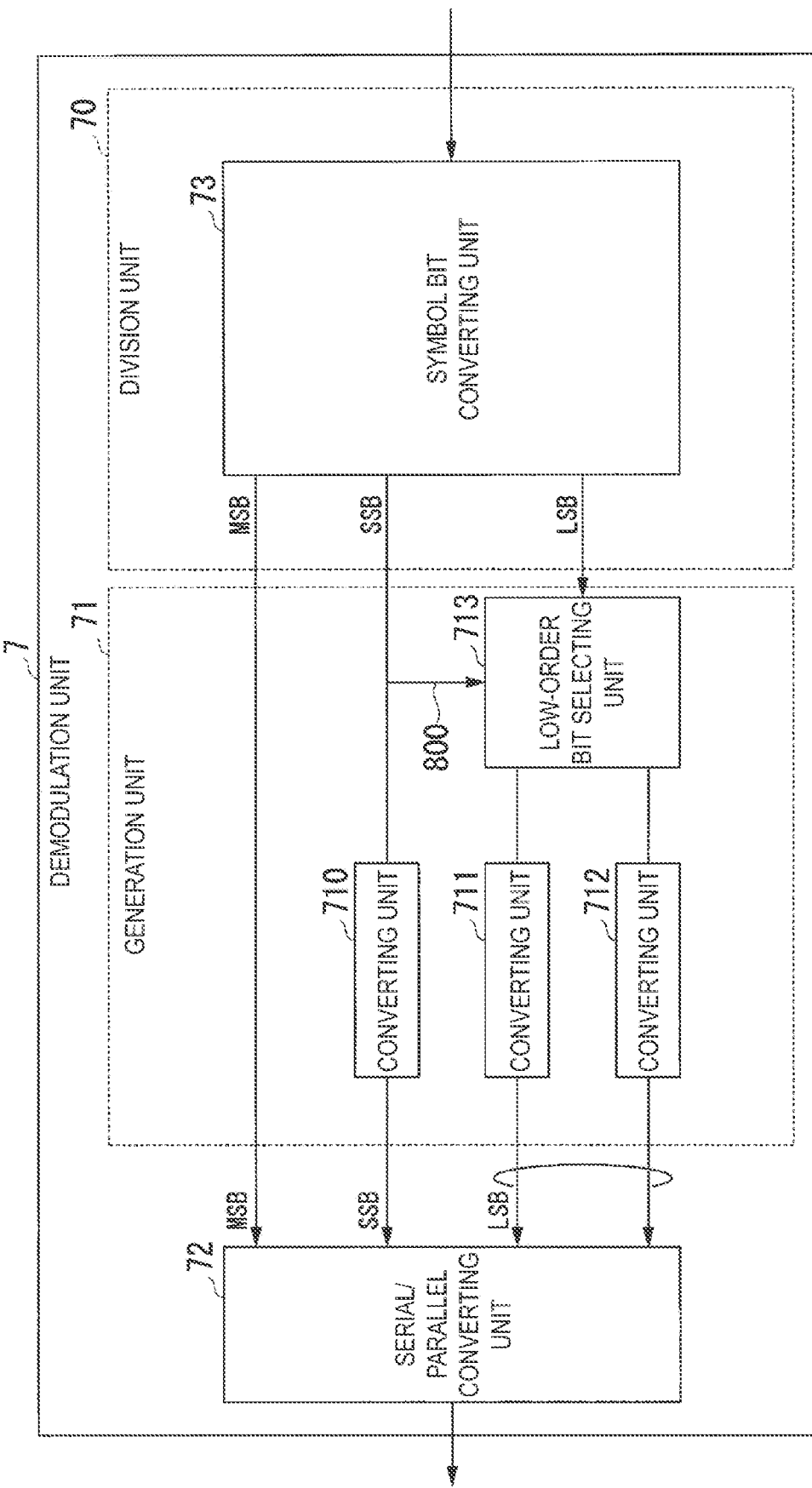
FIG. 4 is a diagram illustrating an example of a configuration of a 64-QAM demodulation unit according to the first embodiment.

FIG. 4 is a diagram illustrating an example of a configuration of the demodulation unit 7 for 64 QAM. The demodulation unit 7 includes a division unit 70, a generation unit 71, and a parallel/serial converting unit 72. The division unit 70 includes a symbol bit converting unit 73. The generation unit 71 includes a converting unit 710, a converting unit 711, a converting unit 712, a low-order bit selecting unit 713, and a signal line 800.

The symbol bit converting unit 73 converts, into a bit sequence, a value representing the symbol for the received optical signal. The symbol bit converting unit 73 outputs the SSB bit sequence resulting from conversion, to the low-order bit selecting unit 713 via the signal line 800. Here, the symbol bit converting unit 73 outputs the SSB bit sequence not subjected to the entropy conversion yet by the converting unit 710, to the low-order bit selecting unit 713 via the signal line 800.

The converting unit 710 performs an entropy conversion on the SSB bit sequence to generate an SSB bit sequence subjected to the entropy conversion. The sequence length of the SSB bit sequence input to the converting unit 710 is equal to or greater than the second sequence length of the SSB bit sequence subjected to the entropy conversion. The converting unit 711, the converting unit 712, and the low-order bit selecting unit 713 generate a first LSB bit sequence subjected to the entropy conversion and a second LSB bit sequence subjected to the entropy conversion, in accordance with the SSB bit sequence. The parallel/serial converting unit 72 performs parallel/serial conversion processing on the MSB bit sequence, the SSB bit sequence subjected to the entropy conversion, the first LSB bit sequence subjected to the entropy conversion, and the second LSB bit sequence subjected to the entropy conversion.

Figure 5:
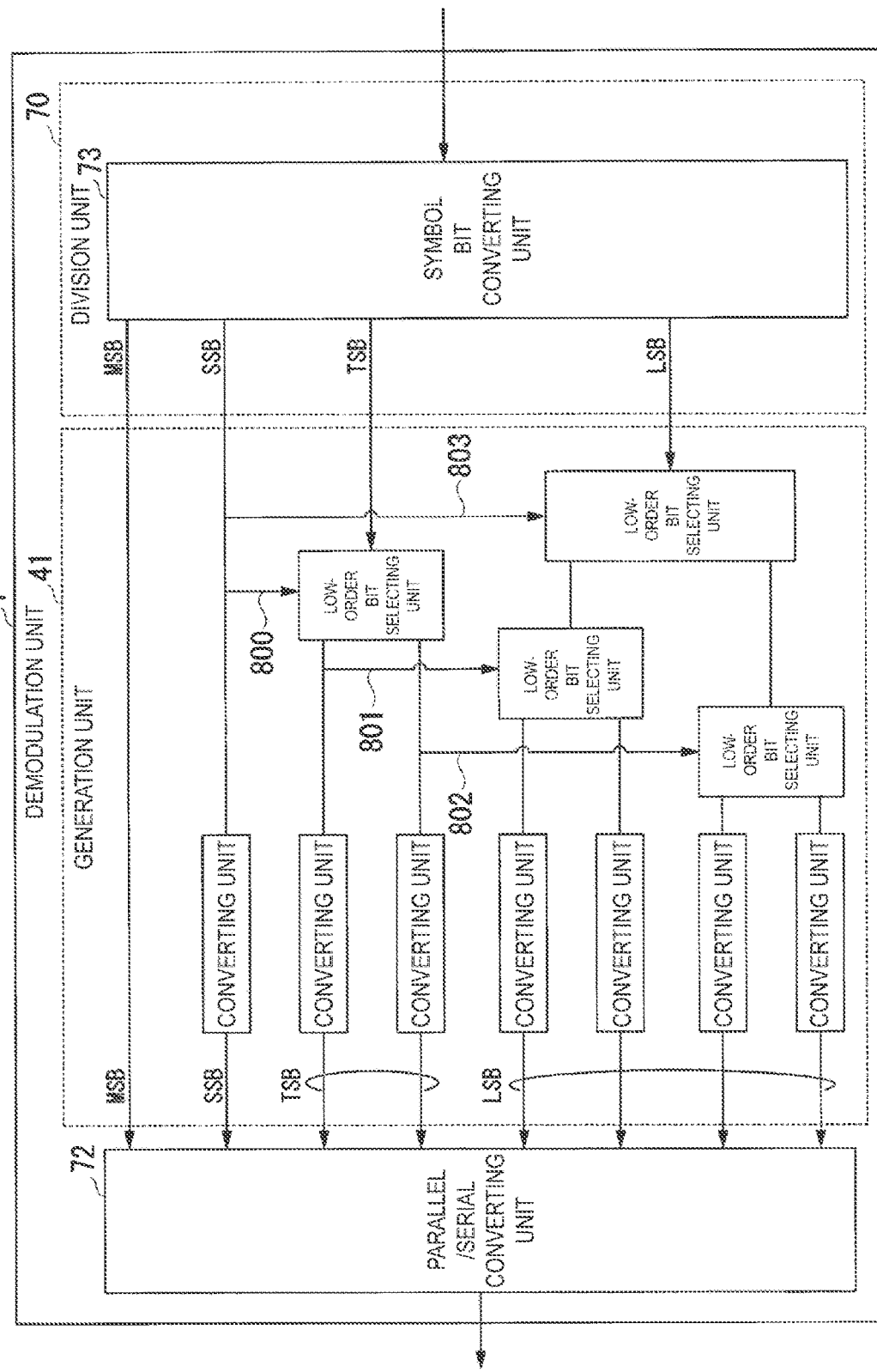
FIG. 5 is a diagram illustrating an example of a configuration of a 256-QAM demodulation unit according to the first embodiment.

FIG. 5 is a diagram illustrating an example of a configuration of the demodulation unit 7 for 256 QAM. The signal line 800 outputs an SSB bit sequence not subjected to the entropy conversion yet to a low-order bit selecting unit that outputs the first TSB bit sequence and the second TSB bit sequence to each of the converting units. The signal line 801 outputs a first TSB bit sequence not subjected to the entropy conversion yet, to a low-order bit selecting unit that outputs the first LSB bit sequence and the second LSB bit sequence. The signal line 802 outputs a second TSB bit sequence not subjected to the entropy conversion yet, to a low-order bit selecting unit that outputs the third LSB bit sequence and the fourth LSB bit sequence. The signal line 803 outputs, to the low-order bit selecting unit for the LSBs, the SSB bit sequence output from the symbol bit converting unit 73.

As is the case with the modulation unit 4 illustrated in FIG. 3, by adding the converting units and the low-order bit selecting units to the demodulation unit 7, the demodulation unit 7 for $2^{(2 \times M)}$ QAM can be represented.

In this way, the demodulation processing by the demodulation unit 7 is opposite to the modulation processing by the modulation unit 4. Consequently, the direction of the flow of the bit sequence in the demodulation unit 7 is in principle opposite to the direction of the flow of the bit sequence in the modulation unit 4.

By way of exception, the direction of the flow of the bit sequence in the signal line 500 of the modulation unit 4 is the same as the direction of the bit sequence flow in the signal line 800 of the demodulation unit 7. In other words, the direction of the flow of the bit sequence in the signal line 800 of the demodulation unit 7 corresponds to a direction from the converting unit 710 to the low-order bit selecting unit 713. The direction of the flow of the bit sequence in the signal line 500 of the modulation unit 4 corresponds to a direction from the converting unit 410 to the low-order bit selecting unit 413. Similarly, the direction of signal line 801 is the same as the direction of signal line 501. The direction of the signal line 802 is the same as the direction of the signal line 502. The direction of the signal line 803 is the same as the direction of the signal line 503.

It has been clarified that the flow of the bit sequence in the demodulation unit 7 is opposite to the flow of the bit sequence in the modulation unit 4, and thus only the modulation unit 4 will be described below.

Referring back to FIG. 2, details of the configuration of the modulation unit 4 for 64 QAM will be described. The serial/parallel converting unit 40 acquires a bit sequence (random bit sequence) with a sequence length of 100 bits, for example. The serial/parallel converting unit 40 performs a serial/parallel conversion on the bit sequence input to the serial/parallel converting unit 40.

In other words, the serial/parallel converting unit 40 divides the bit sequence input to the serial/parallel converting unit 40 into an MSB bit sequence, an SSB bit sequence, a first LSB bit sequence (low-order first bit sequence), and a second LSB bit sequence (low-order second bit sequence) in order from low-order bit sequences to high-order bit sequences. The sequence length of the bit sequence input to the serial/parallel converting unit 40 is equal to the sum of the sequence length of the MSB bit sequence, the sequence length of the SSB bit sequence, the sequence length of the first LSB bit sequence, and the sequence length of the second LSB bit sequence.

The serial/parallel converting unit 40 outputs, to the bit symbol converting unit 43 as an MSB bit sequence, the most-significant bit sequence with the first sequence length included in the bit sequence input to the serial/parallel converting unit 40.

The serial/parallel converting unit 40 outputs, to the converting unit 410 as an SSB bit sequence, the second-significant bit sequence with the second sequence length included in the bit sequence input to the serial/parallel converting unit 40.

The serial/parallel converting unit 40 outputs, to the converting unit 411 as a first LSB bit sequence, the least-significant bit sequence with the third sequence length included in the bit sequence input to the serial/parallel converting unit 40. The serial/parallel converting unit 40 outputs, to the converting unit 412 as a second LSB bit sequence, the least-significant bit sequence with the fourth sequence length included in the bit sequence input to the serial/parallel converting unit 40.

The sequence length of each bit sequence output by the serial/parallel converting unit 40 is predetermined. Specifically, the following are predetermined: the sequence length (first sequence length) of the MSB bit sequence, the sequence length (second sequence length) of the SSB bit sequence, the sequence length (third sequence length) of the first LSB bit sequence, and the sequence length (fourth sequence length) of the second LSB bit sequence. Here, the first sequence length is equal to or greater than the second sequence length, equal to or greater than the third sequence length, and equal to or greater than the fourth sequence length.

The converting unit 410 is an entropy conversion circuit converting the SSB bit sequence output from the serial/parallel converting unit 40 into an SSB bit sequence for which the probability of occurrence of 0 or the probability of occurrence of 1 is a predetermined probability of occurrence. The sequence length of the SSB bit sequence subjected to the entropy conversion and output from the converting unit 410 is equal to or greater than a sequence length of the SSB bit sequence input to the converting unit 410. The probability of occurrence of 0 or the probability of occurrence of 1 in the SSB bit sequence subjected to the entropy conversion is predetermined to be any probability of occurrence. The probability of occurrence of 0 or the probability of occurrence of 1 in the SSB bit sequence output from the converting unit 410 is predetermined such that the distribution of the probabilities of occurrence of the symbols for the optical signal transmitted by the optical signal follows a set distribution. In an AWGN environment, for example, the Maxwell-Boltzmann distribution is the optimal distribution. The relationship between the probability of occurrence of a bit (0,1) in an output from each converting unit for 64 QAM and a probability distribution of symbols (a, b, c, d) will be described below by using FIG. 7. The probability of occurrence of the bit (0,1) in the output from each converting unit may be determined from the set probabilities distribution of the symbols by using the relationship between the probability of occurrence and the probability distribution.

Pout1(0), which is the probability of occurrence of 0 in the SSB bit sequence output from the converting unit 410 to the bit symbol converting unit 43 and the low-order bit selecting unit 413, is 0.7 as an example. Pout1(1), which is the probability of occurrence of 1 in the SSB bit sequence output from the converting unit 410 to the bit symbol converting unit 43 and the low-order bit selecting unit 413, is 0.3 as an example.

The converting unit 410 outputs, to the bit symbol converting unit 43 on a bit-by-bit basis, an SSB bit sequence subjected to the entropy conversion and for which the probability of occurrence of 0 or the probability of occurrence of 1 is adjusted. The converting unit 410 outputs the SSB bit sequence subjected to the entropy conversion and for which the probability of occurrence of 0 or the probability of occurrence of 1 has been adjusted, to the low-order bit selecting unit 413 via the signal line 500 on a bit-by-bit basis.

The converting unit 411 is an entropy conversion circuit that converts the first LSB bit sequence into a first LSB bit sequence (low-order bit sequence) for which the probability of occurrence of 0 or the probability of occurrence of 1 is a predetermined probability of occurrence. The sequence length of the first LSB bit sequence subjected to the entropy conversion and output from the converting unit 411 is equal to or greater than the sequence length of the first LSB bit sequence input to the converting unit 411. The probability of occurrence of 0 or the probability of occurrence of 1 in the first LSB bit sequence subjected to the entropy conversion is predetermined to be any probability of occurrence. The probability of occurrence of 0 or the probability of occurrence of 1 in the first LSB bit sequence output from the converting unit 411 is predetermined to be any probability of occurrence such that the distribution of the probability of occurrence of the symbol of the optical signal transmitted by the optical signal follows a set distribution. The converting unit 411 outputs, on a bit-by-bit basis, a first LSB bit sequence subjected to the entropy conversion and for which the probability of occurrence of 0 or the probability of occurrence of 1 is adjusted to the low-order bit selecting unit 413.

The converting unit 412 is an entropy conversion circuit that converts a second LSB bit sequence into a second LSB bit sequence (least significant bit sequence) where the probability of occurrence of 0 or the probability of occurrence of 1 is a predetermined probability of occurrence. The sequence length of the second LSB bit sequence subjected to the entropy conversion and output from the converting unit 412 is equal to or greater than a sequence length of the second LSB bit sequence input to the converting unit 412. The probability of occurrence of 0 or the probability of occurrence of 1 in the second LSB bit sequence subjected to the entropy conversion is predetermined to be any probability of occurrence. The probability of occurrence of 0 or the probability of occurrence of 1 in the second LSB bit sequence output from the converting unit 412 is predetermined to be any probability of occurrence such that the distribution of the probability of occurrence of the symbol of the optical signal transmitted by the optical signal follows the set distribution. The converting unit 412 outputs, to the low-order bit selecting unit 413 on a bit-by-bit basis, the second LSB bit sequence subjected to the entropy conversion and for which the probability of occurrence of 0 or the probability of occurrence of 1 has been adjusted.

The low-order bit selecting unit 413 acquires, from the converting unit 410 via the signal line 500, the SSB bit sequence for which the probability of occurrence of 0 or the probability of occurrence of 1 has been adjusted. The low-order bit selecting unit 413 acquires the first LSB bit sequence from the converting unit 411. The low-order bit selecting unit 413 acquires the second LSB bit sequence from the converting unit 412.

Figure 6:
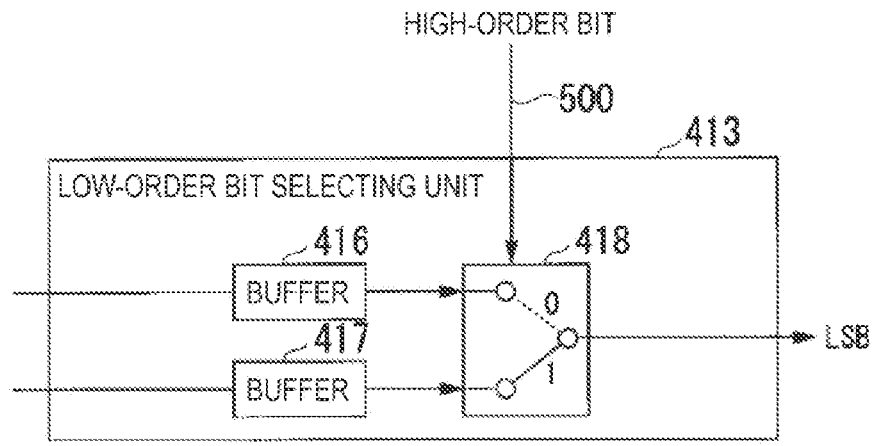
FIG. 6 is a diagram illustrating an example of a configuration of a low-order bit selecting unit according to the first embodiment.

FIG. 6 is a diagram illustrating an example of a configuration of the low-order bit selecting unit 413. The low-order bit selecting unit 413 includes a buffer 416, a buffer 417, and a switching unit 418. The buffer 416 stores the first LSB bit sequence. The buffer 417 stores the second LSB bit sequence. The buffer 416 and buffer 417 include queues and output stored bits on a First In, First Out (FIFO) basis.

The low-order bit selecting unit 413 acquires a high-order bit from the converting unit 410 via the signal line 500. The low-order bit selecting unit 413 selects either a bit from the first sequence of the LSBs stored in the buffer 416 or a bit from the second sequence of the LSBs stored in the buffer 417, in accordance with the acquired high-order bit. The low-order bit selecting unit 413 outputs the selected bit to the bit symbol converting unit 43 as an LSB output.

For example, in a case of acquiring a bit of 0 from the SSB bit sequence subjected to the entropy conversion from the converting unit 410, the low-order bit selecting unit 413 outputs a bit from the first LSB sequence stored in the buffer 416 to the bit symbol converting unit 43 as an LSB output.

For example, in a case of acquiring a bit of 1 from the SSB bit sequence subjected to the entropy conversion from the converting unit 410, the low-order bit selecting unit 413 outputs a bit from the second LSB sequence stored in the buffer 417 to the bit symbol converting unit 43 as an LSB output.

The bit symbol converting unit 43 converts the MSB, SSB, and LSB bit sequences input to the bit symbol converting unit 43 into In-phase or Quadrature-phase symbols. In other words, the bit symbol converting unit 43 performs mapping of symbols on the I or Q axes. The bit symbol converting unit 43 outputs the conversion result of the bit sequence into symbols to the transmission unit 5 as a value (code) representing the symbol for the optical signal to be transmitted.

Figure 7:
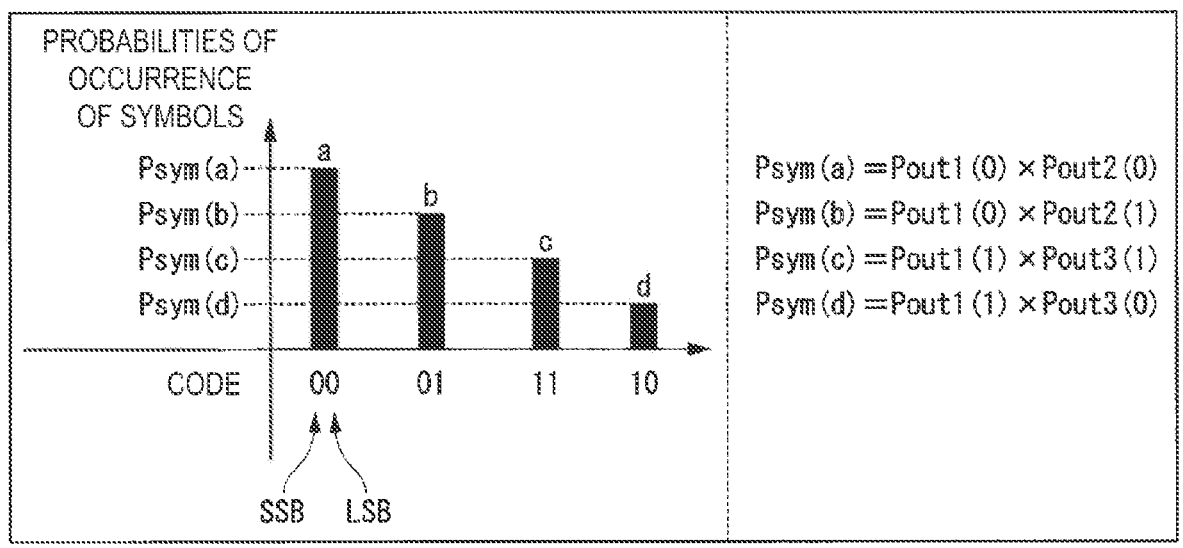
FIG. 7 is a diagram illustrating an example of a relationship between codes of symbols and the probabilities of occurrence of the symbols according to the first embodiment.

FIG. 7 is a diagram illustrating an example of a relationship between codes of symbols and the probability of occurrence of each symbol. The low-order bit selecting unit 413 selects which of the bit from the first LSB bit sequence and the bit from the second LSB bit sequence is determined to be a high-order bit depending on the bit from the SSB bit sequence subjected to the entropy conversion.

The codes illustrated in FIG. 7 represent the SSB bit sequence and the LSB bit sequence. Psm(a), which is the probability of occurrence of the symbol "00", is Pout1(0)×Pout2(0). Pout1(0) is the probability of occurrence of "0" in the SSB bit sequence subjected to the entropy conversion and corresponding to an output from the converting unit 410. Pout2(0) is the probability of occurrence of "0" in the first LSB bit sequence subjected to the entropy conversion and corresponding to an output from the converting unit 411.

Psym(b), which is the probability of occurrence of the symbol "01" is Pout1(0)×Pout2(1). Pout2(1) is the probability of occurrence of "1" in the first LSB bit sequence subjected to the entropy conversion and corresponding to an output from the converting unit 411.

Psym(c), which is the probability of occurrence of the symbol "11", is Pout1(1)×Pout3(1). Pout1(1) is the probability of occurrence of "1" in the SSB bit sequence subjected to the entropy conversion and corresponding to an output from the converting unit 410. Pout3(1) is the probability of occurrence of "1" in the second LSB bit sequence subjected to the entropy conversion and corresponding to an output from the converting unit 412.

Psym(d), which is the probability of occurrence of the symbol "10", is Pout1(1)×Pout3(0). Pout3(0) is the probability of occurrence of "0" in the second LSB bit sequence subjected to the entropy conversion and corresponding to an output from the converting unit 412.

Figure 8:
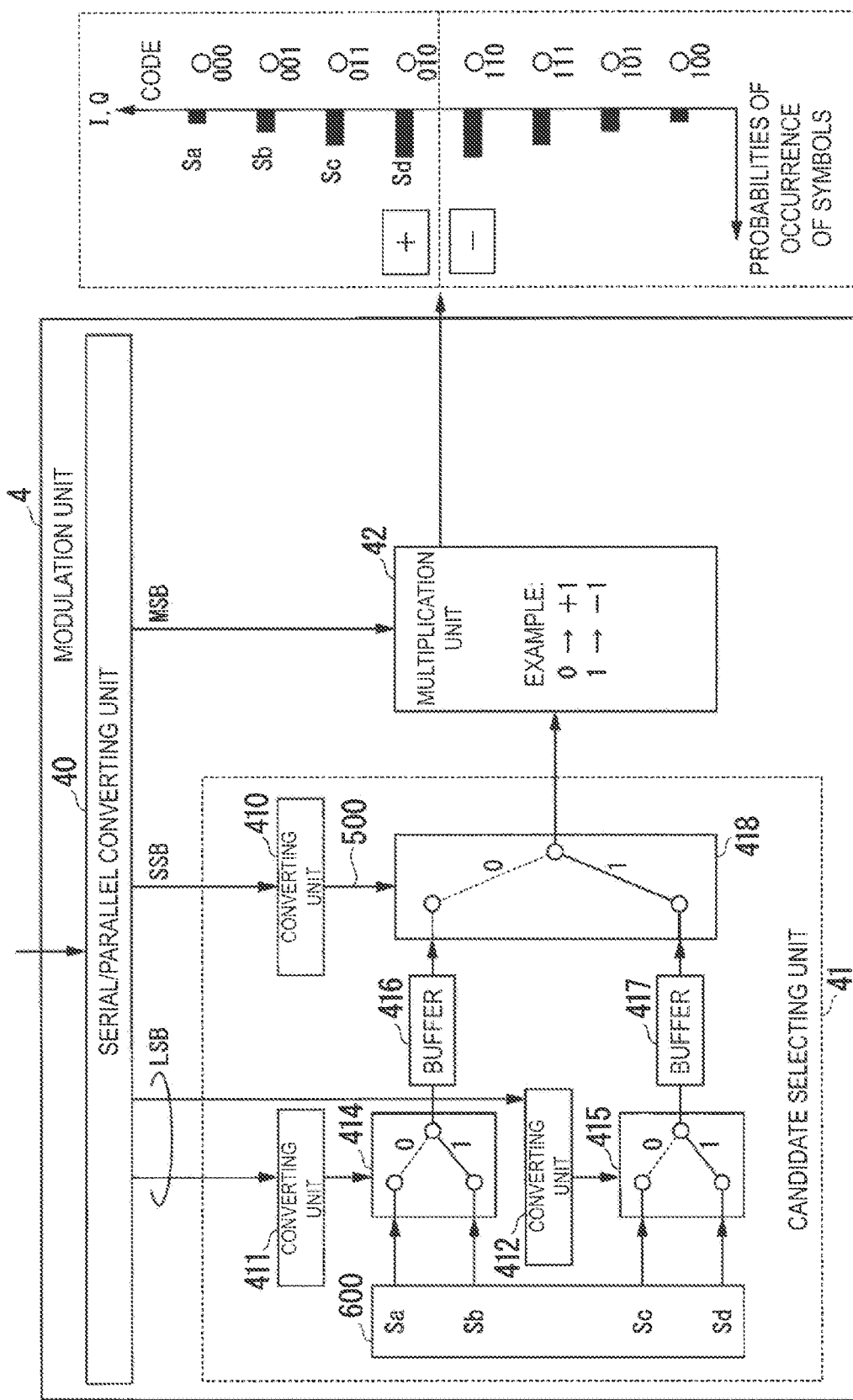
FIG. 8 is a diagram illustrating an example of an equivalent configuration of a modulation unit according to the first embodiment.

FIG. 8 is a diagram illustrating an example of an equivalent configuration of the modulation unit 4 illustrated in FIG. 2. The modulation unit 4 includes the serial/parallel converting unit 40, the candidate selecting unit 41, and the multiplication unit 42. The candidate selecting unit 41 generates a symbol sequence on the basis of predetermined candidates for a symbol, in accordance with the bit sequence output from the converting unit 410, the bit sequence output from the converting unit 411, and the bit sequence output from the converting unit 412. The candidate selecting unit 41 includes the converting unit 410, the converting unit 411, the converting unit 412, and the signal line 500. The candidate selecting unit 41 includes a storage unit 600.

The candidate selecting unit 41 includes a switching unit 414, a switching unit 415, a buffer 416, a buffer 417, and a switching unit 418. The buffer 416, the buffer 417, and the switching unit 418 provide a configuration equivalent to the low-order bit selecting unit 413 illustrated in FIG. 2. The converting unit 410, the converting unit 411, and the converting unit 412 provide a configuration equivalent to the converting unit illustrated in FIG. 2.

In a case where the number of predetermined candidates for the symbol is ($2^n$), the candidate selecting unit 41 includes ($2^n-1$) converting units and ($2^n-1$) switching units. In FIG. 8, for a predetermined optical signal to be transmitted, four ($=2^2$) candidates for the symbol Sa, Sb, Sc, and Sd are provided. Thus, the candidate selecting unit 41 includes three ($=2^2-1$) converting units (the converting unit 410, the converting unit 411, and the converting unit 412), and the switching unit 414, the switching unit 415, and the switching unit 418, used as three selecting units. The storage unit 600 pre-stores the candidates for the symbol (Sa, Sb, Sc, and Sd).

The serial/parallel converting unit 40 outputs the most-significant bit sequence with the first sequence length included in the bit sequence input to the serial/parallel converting unit 40, to the multiplication unit 42 as an MSB bit sequence on a bit-by-bit basis.

The converting unit 410 outputs, to the switching unit 418 via the signal line 500 on a bit-by-bit basis, the SSB bit sequence subjected to the entropy conversion and for which the probability of occurrence of 0 or the probability of occurrence of 1 has been adjusted. The converting unit 411 outputs, to the switching unit 414 on a bit-by-bit basis, the first LSB bit sequence subjected to the entropy conversion and for which the probability of occurrence of 0 or the probability of occurrence of 1 has been adjusted. The converting unit 412 outputs, to the switching unit 415 on a bit-by-bit basis, the second LSB bit sequence subjected to the entropy conversion and for which the probability of occurrence of 0 or the probability of occurrence of 1 has been adjusted.

The switching unit 414 acquires, from the converting unit 411, the first LSB bit sequence subjected to the entropy conversion and for which the probability of occurrence of 0 or the probability of occurrence of 1 has been adjusted. In a case where the bit in the first LSB bit sequence subjected to the entropy conversion is 0, the switching unit 414 outputs, to the buffer 416, the symbol Sa, which is one of the symbol candidates for the optical signal to be transmitted. In a case where the bit in the first LSB bit sequence subjected to the entropy conversion is 1, the switching unit 414 outputs, to the buffer 416, the symbol Sb, which is one of the symbol candidates for the optical signal to be transmitted.

The switching unit 415 acquires, from the converting unit 412 on a bit-by-bit basis, the second LSB bit sequence subjected to the entropy conversion and for which the probability of occurrence of 0 or the probability of occurrence of 1 has been adjusted. In a case where the bit in the second LSB bit sequence subjected to the entropy conversion is 0, the switching unit 415 outputs, to the buffer 417, the symbol Sc, which is one of the symbol candidates for the optical signal to be transmitted. In a case where the bit in the second LSB bit sequence subjected to the entropy conversion is 1, the switching unit 415 outputs, to the buffer 417, the symbol Sd, which is one of the symbol candidates for the optical signal to be transmitted.

The buffer 416 and the buffer 417 are each a volatile recording medium such as a Random Access Memory (RAM). The buffer 416 and the buffer 417 may each be a non-volatile storage apparatus (non-temporary recording medium) such as a flash memory.

The buffer 416 temporarily stores the symbol Sa or the symbol Sb output from the switching unit 414. The buffer 417 temporarily stores the symbol Sc or the symbol Sd output from the switching unit 415. Each of the buffer 416 and buffer 417 includes a queue and outputs the symbol sequence on a First In, First Out (FIFO) basis.

The switching unit 418 acquires, from the converting unit 410 on a bit-by-bit basis, the SSB bit sequence subjected to the entropy conversion and for which the probability of occurrence of 0 or the probability of occurrence of 1 has been adjusted. In a case where the bit in the SSB bit sequence subjected to the entropy conversion is 0, the switching unit 418 outputs, to the multiplication unit 42, the symbol Sa or symbol Sb stored in the buffer 416. In a case where the bit in the SSB bit sequence subjected to the entropy conversion is 1, the switching unit 418 outputs, to the multiplication unit 42, the symbol Sc or symbol Sd stored in the buffer 417.

The multiplication unit 42 acquires the MSB bit sequence from the serial/parallel converting unit 40 on a bit-by-bit basis. The multiplication unit 42 acquires one symbol selected from among the candidates for the symbol (symbol Sa, symbol Sb, symbol Sc, and symbol Sd), from the switching unit 418 on a bit-by-bit basis for the SSB bit sequence subjected to the entropy conversion.

In the first embodiment, the multiplication unit 42 multiplies the code for the acquired symbol (the value representing the symbol) by a real number in accordance with the bit in the MSB bit sequence. For example, in a case where the bit in the MSB bit sequence is 0, the multiplication unit 42 multiplies the code for the acquired symbol by (+1). For example, in a case where the bits in the MSB bit sequence is 1, the multiplication unit 42 multiplies the code for the acquired symbol by (−1). The multiplication unit 42 outputs, to the transmission unit 5, the result of multiplication of the code for the symbol by the real number.

Figure 9:
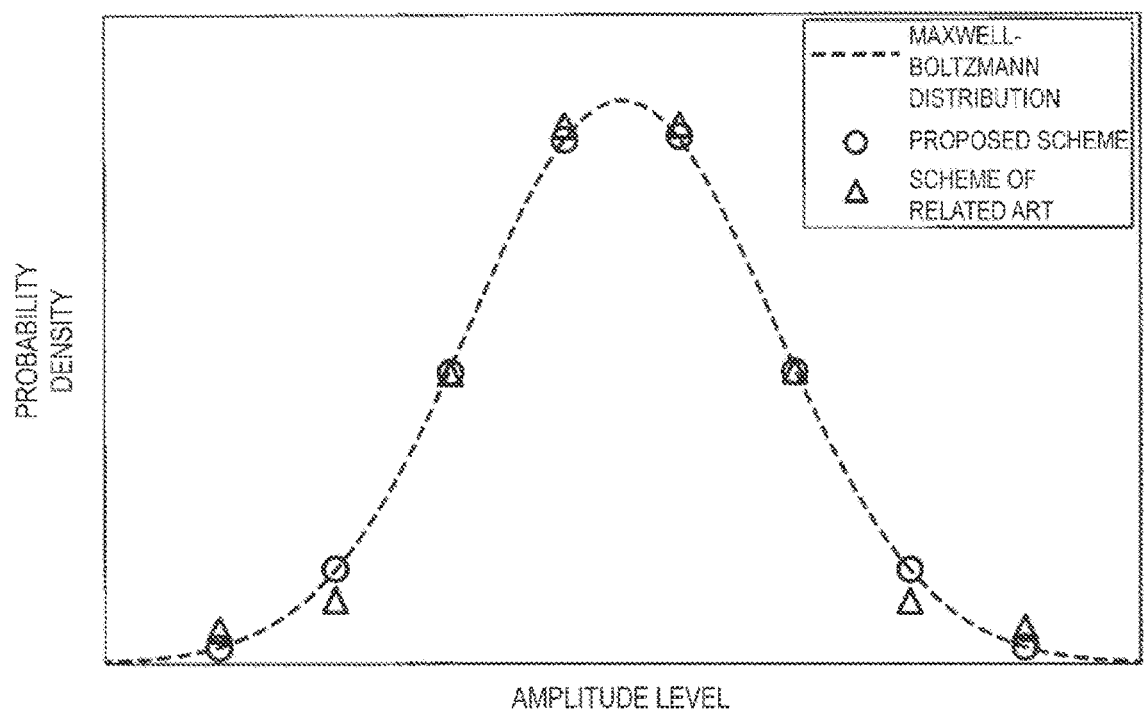
FIG. 9 is a diagram illustrating an example of a relationship between an amplitude and the occurrence density of symbols appearing in the first embodiment.

FIG. 9 is a diagram illustrating an example of a relationship between the amplitude and the occurrence density of the symbols. The horizontal axis indicates the level of amplitude. The vertical axis indicates the occurrence density of the symbols. The "proposed scheme" illustrated in FIG. 9 is a symbol allocation scheme performed by the modulation unit 4. In the scheme performed by the modulation unit 4, the probability of occurrence of the symbol complies with a set distribution (here, the Maxwell-Boltzmann distribution). Note that parameters for the probability of occurrence in each of the converting units are adjusted such that the transmission capacity in the proposed scheme is the same as the transmission capacity in the scheme of related art.

Figure 10:
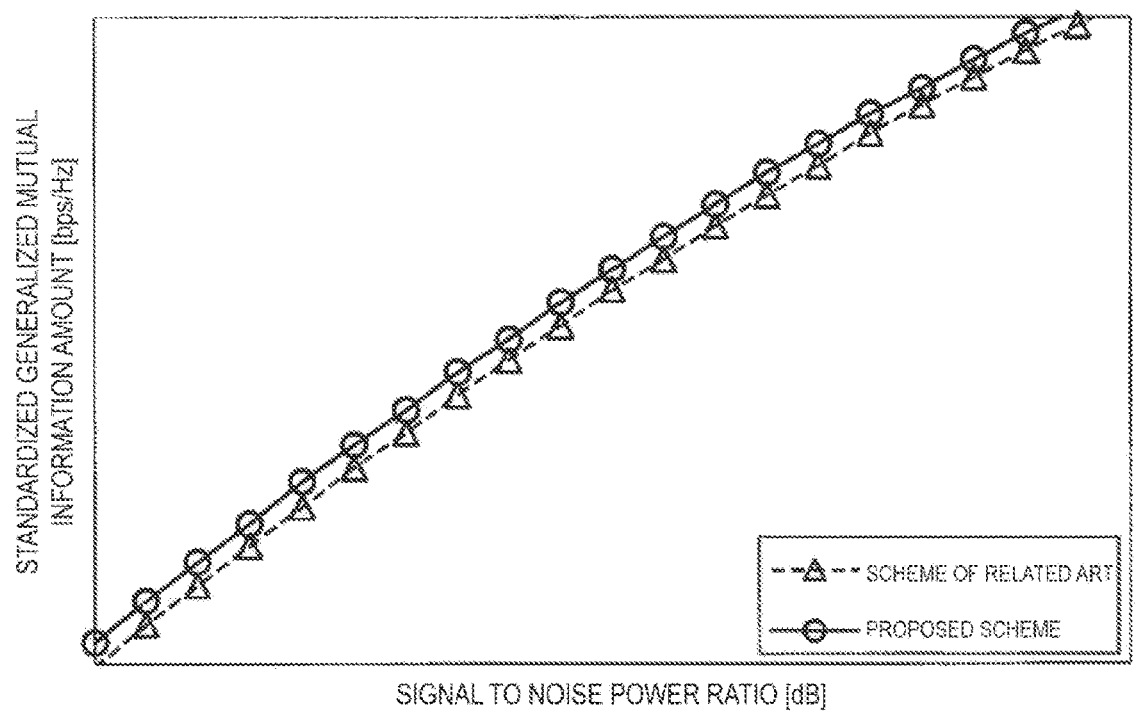
FIG. 10 is a diagram illustrating an example of a relationship between a signal to noise power ratio and mutual information according to the first embodiment.

FIG. 10 is a diagram illustrating an example of a relationship between a signal to noise power ratio and mutual information. The horizontal axis indicates the signal to noise power ratio. The vertical axis indicates the generalized mutual information resulting from standardization (normalization) (hereinafter referred to as the "standardized generalized mutual information"). The standardized generalized mutual information is a communication capacity that can be achieved when ideal binary soft decision error correcting codes are used. As indicated by the results of comparison in which the same standardized generalized mutual information is used for the "proposed scheme" and for a "scheme of related art," the proposed scheme requires a lower signal to noise power ratio than the scheme of related art.

As described above, the optical communication system 1 according to the first embodiment includes the optical transmitter 2 and the optical receiver 3. The optical transmitter 2 includes the serial/parallel converting unit 40 (a serial/parallel converter), the converting unit 410 (an entropy converter), the converting unit 411 (an entropy converter), the converting unit 412 (an entropy converter), a selecting unit (a selector) (switching unit and buffer), and the multiplication unit 42 (multiplicator). The optical receiver 3 includes the reception unit 6 receiving an optical signal, and the demodulation unit 7 performing demodulation processing on an electrical signal generated in accordance with the received optical signal.

The serial/parallel converting unit 40 divides a bit sequence in which the probability of occurrence of 0 or the probability of occurrence of 1 is a first probability (e.g., 0.5) into an MSB bit sequence (most-significant bit sequence), an SSB bit sequence (second-significant bit sequence), a first LSB bit sequence (low-order bit sequence), and a second LSB bit sequence (least-significant bit sequence).

The converting unit 410 converts the SSB bit sequence into a second-significant bit sequence for which the probability of occurrence of 0 or the probability of occurrence of 1 is any second probability. The converting unit 411 converts the first LSB bit sequence (low-order bit sequence) into a low-order bit sequence for which the probability of occurrence of 0 or the probability of occurrence of 1 is any third probability. The converting unit 412 converts the second LSB bit sequence (least-significant bit sequence) into a least-significant bit sequence for which the probability of occurrence of 0 or the probability of occurrence of 1 is any fourth probability.

The selecting unit (switching unit and buffer) selects a first symbol and a second symbol from a plurality of candidates for a symbol in accordance with the first LSB bit sequence resulting from the conversion and the second LSB bit sequence resulting from the conversion. The selecting unit selects a symbol for the optical signal to be transmitted from the first symbol or the second symbol in accordance with the SSB bit sequence resulting from the conversion. The selecting unit selects the symbol for the optical signal to be transmitted from a plurality of candidates for the symbol arranged in a two-dimensional complex plane (IQ plane) in the amplitude direction. The multiplication unit 42 multiplies a value (code) representing the symbol for the optical signal to be transmitted by a real number (e.g., +1 or −1) in accordance with the MSB bit sequence. The multiplication unit 42 multiplies, by the real number, the value representing the symbol for the optical signal to be transmitted. The transmission unit 5 (a signal transmitter) transmits the optical signal based on the result of the multiplication by the real number. The reception unit 6 (a signal receiver) receives the optical signal. The demodulation unit 7 (a demodulator) performs demodulation processing on an electrical signal generated in accordance with the received optical signal.

As described above, the optical communication system 1 can arbitrarily adjust the probabilities of occurrence of symbols by using a simple configuration. The optical communication system 1 can suppress the transmission power of the optical signal.

In the first embodiment, as illustrated in FIG. 8, the positions of the symbols are limited onto the I axis or the Q axis. However, the optical communication system 1 allows for a reduction in magnitude of circuit of the modulation unit 4.

In a case of allocating symbols on the IQ plane, the modulation unit 4 uses bit-level converting units (probability heterogenization circuit) connected in multiple stages and the low-order bit selecting unit 413 to control the output of each symbol point. Thus, the modulation unit 4 can define the distribution of the symbols in the IQ plane to be any probability distribution. The modulation unit 4 can perform parallel processing of symbol allocation, with the degradation (transmission loss) of characteristics of the transmission capacity suppressed. The modulation unit 4 can suppress the transmission power of the optical signal.

Second Embodiment

The second embodiment differs from the first embodiment in that the multiplication unit 42 multiplies, by any number (complex number), the bit sequence output from the candidate selecting unit 41. In the second embodiment, differences from the first embodiment will be described.

Figure 11:
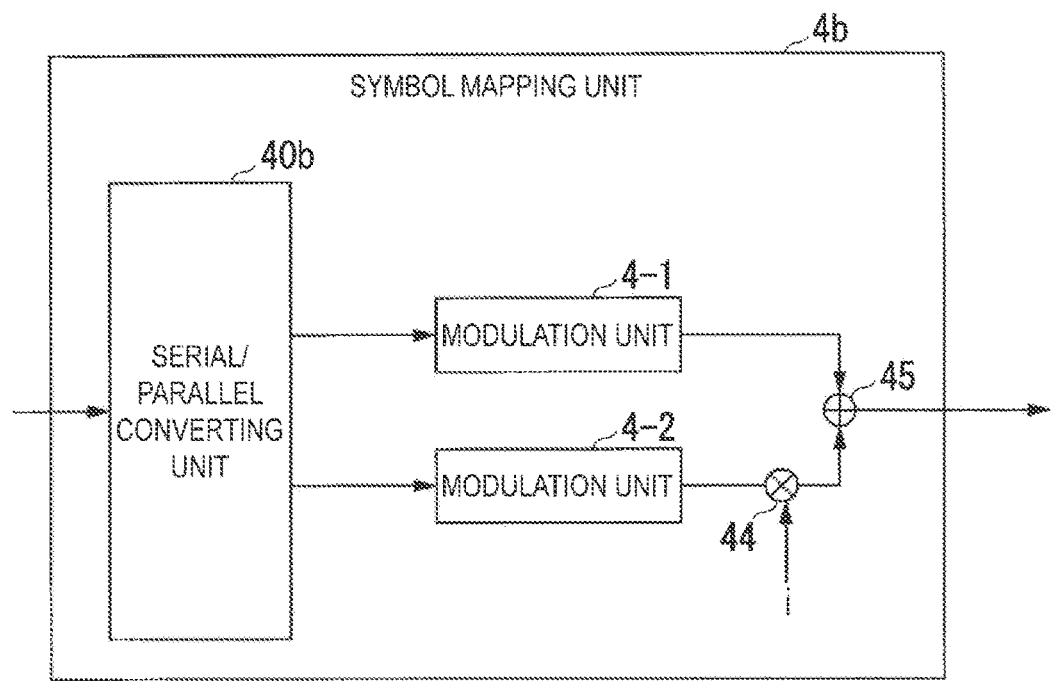
FIG. 11 is a diagram illustrating an example of a configuration of a symbol mapping unit for square QAM according to a second embodiment.

FIG. 11 is a diagram illustrating an example of a configuration of the symbol mapping unit 4b for square QAM. The optical transmitter 2 includes the symbol mapping unit 4b and the transmission unit 5. The symbol mapping unit 4a for square QAM includes a serial/parallel converting unit 40b, a modulation unit 4-1, a modulation unit 4-2, an imaginary-number converting unit 44, and a multiplexing unit 45. The symbol mapping unit 4b for square QAM includes the modulation units 4-1 and 4-2 in parallel.

The serial/parallel converting unit 40b acquires bit sequences and parallels the bit sequences acquired such that a bit sequence to the modulation unit 4-1 and a bit sequence to the modulation unit 4-2 are in the ratio of 1 to 1. The serial/parallel converting unit 40b outputs, to the modulation units 4-1 and 4-2, the bit sequences parallelized to achieve a ratio of 1 to 1.

The modulation unit 4-1 performs modulation processing on the bit sequence acquired from the serial/parallel converting unit 40b. The modulation unit 4-1 outputs, to the multiplexing unit 45, a real-number symbol sequence corresponding to the result of the modulation processing.

The modulation unit 4-2 performs modulation processing on the bit sequence acquired from the serial/parallel converting unit 40b. The modulation unit 4-2 outputs, to the imaginary-number converting unit 44, the real-number symbol sequence corresponding to the result of the modulation processing.

The imaginary-number converting unit 44 converts, into an imaginary-number symbol sequence, the real-number symbol sequences output from the modulation unit 4-2.

The multiplexing unit 45 multiplexes the real-number symbol sequence and the imaginary-number symbol sequence to generate a complex-number symbol sequence. The multiplexing unit 45 outputs the complex-number symbol sequence generated to the transmission unit 5.

Figure 12:
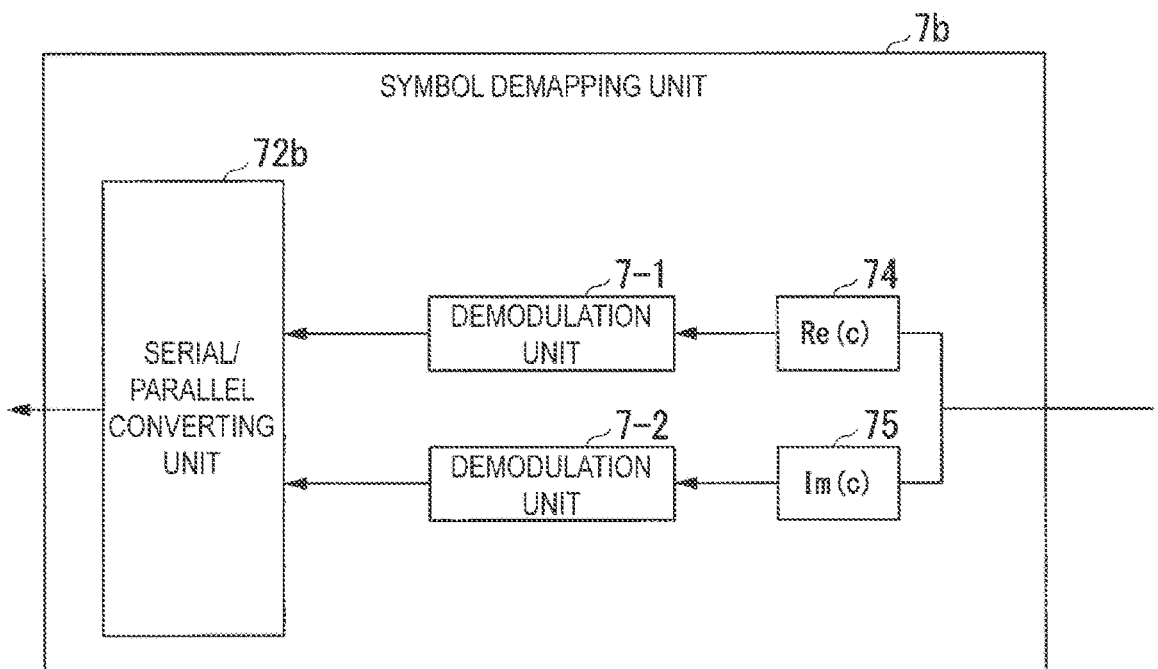
FIG. 12 is a diagram illustrating an example of a configuration of a symbol demapping unit for square QAM according to the second embodiment.

FIG. 12 is a diagram illustrating an example of a configuration of a symbol demapping unit 7b for square QAM. The optical receiver 3 includes a reception unit 6 and the symbol demapping unit 7b. The symbol demapping unit 7b for square QAM includes a parallel/serial converting unit 72b, a demodulation unit 7-1, a demodulation unit 7-2, a real-part extracting unit 74, and an imaginary-part extracting unit 75.

The real-part extracting unit 74 acquires a complex-number symbol sequence from the reception unit 6. The real-part extracting unit 74 extracts a complex-number real part (Re(c)=a) from the complex-number symbol sequence (c=a+jb). The real-part extracting unit 74 outputs a real-number symbol sequence (a) to the demodulation unit 7-1.

The imaginary-part extracting unit 75 acquires a complex-number symbol sequence from the reception unit 6. The imaginary-part extracting unit 75 extracts a complex-number imaginary part (Im(c)=b) from the complex-number symbol sequence (c=a+jb). The imaginary-part extracting units 75 outputs a real-number symbol sequence (b) to the demodulation unit 7-2.

The demodulation unit 7-1 performs demodulation processing on the real-number symbol sequence (a). The demodulation unit 7-1 outputs, to the parallel/serial converting unit 72b, a bit sequence corresponding to the result of the demodulation processing on the real-number symbol sequence (a). The demodulation unit 7-2 performs demodulation processing on the real-number symbol sequence (b). The demodulation unit 7-2 outputs, to the parallel/serial converting unit 72b, a bit sequence corresponding to the result of the demodulation processing on the real-number symbol sequence (b).

The parallel/serial converting unit 72b performs a parallel/serial conversion on the bit sequence acquired from the demodulation unit 7-1 and the bit sequence acquired from the demodulation unit 7-2. The parallel/serial converting unit 72b outputs the serialized bit sequence to a predetermined external device.

Figure 13:
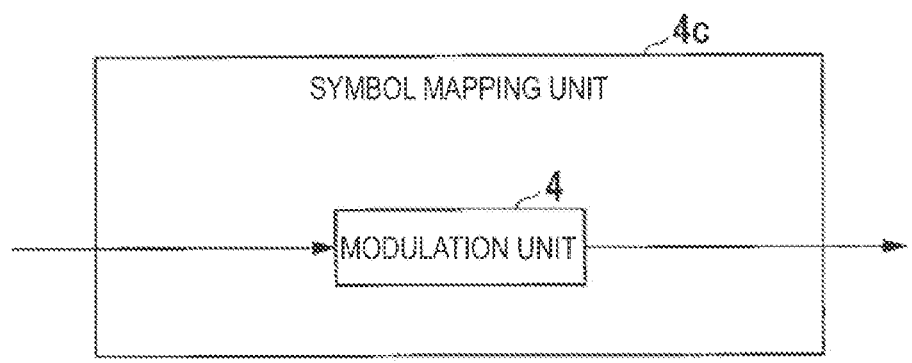
FIG. 13 is a diagram illustrating an example of a configuration of a generalized symbol mapping unit according to the second embodiment.

FIG. 13 is a diagram illustrating an example of a configuration of a generalized symbol mapping unit 4c (symbol mapping unit 4c not limited to square QAM). The optical transmitter 2 includes the symbol mapping unit 4c and the transmission unit 5. The symbol mapping unit 4c performs modulation processing on a bit sequence input to the symbol mapping unit 4c. The symbol mapping unit 4c outputs a complex-number symbol sequence to the transmission unit 5.

Figure 14:
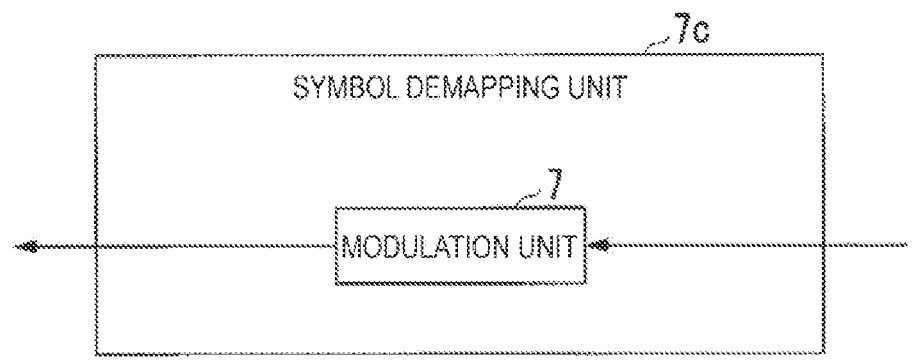
FIG. 14 is a diagram illustrating an example of a configuration of a generalized symbol demapping unit according to the second embodiment.

FIG. 14 is a diagram illustrating an example of a configuration of a generalized symbol demapping unit 7c (symbol demapping unit 7c not limited to square QAM). The optical receiver 3 includes the reception unit 6 and the symbol demapping unit 7c. The symbol demapping unit 7c performs demodulation processing on a bit sequence input to the symbol demapping unit 7c. The symbol demapping unit 7c outputs, to a predetermined external device, the bit sequence on which demodulation processing has been performed.

Figure 15:
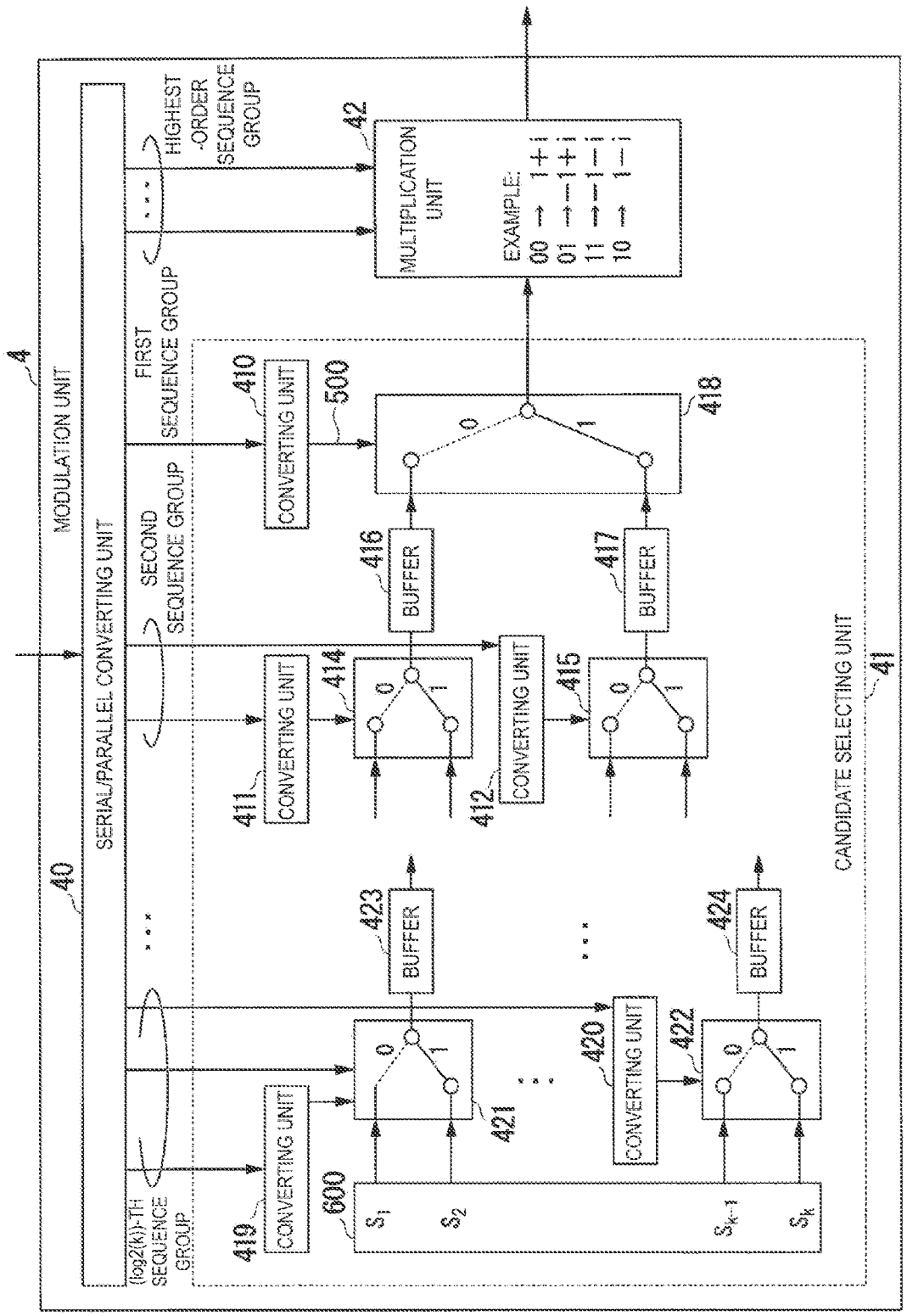
FIG. 15 is a diagram illustrating an example of an equivalent configuration of a generalized modulation unit according to the second embodiment.

FIG. 15 is a diagram illustrating an example of an equivalent configuration of a generalized modulation unit 4 (modulation unit 4 not limited to square QAM). The modulation unit 4 includes the serial/parallel converting unit 40, the candidate selecting unit 41, and the multiplication unit 42. The candidate selecting unit 41 includes converting units in multiple stages. In FIG. 15, the candidate selecting unit 41 includes the converting unit 410, the converting unit 411, the converting unit 412, a converting unit 419, a converting unit 420, a buffer 423, a buffer 424, and the signal line 500.

The serial/parallel converting unit 40 divides a bit sequence input to the serial/parallel converting unit 40 into bit sequences from a highest-order sequence group and a first sequence group to a $(\log_2(k))$-th sequence group in order from high-order bit sequences to low-order bit sequences. Here, k is an integer expressed by $2^{(\log 2N-1)}N/2$. For example, for 16 QAM, k=2. For 64 QAM, k=4. The sequence length of the bit sequence input to the serial/parallel converting unit 40 is equal to the sum of the sequence length of the bit sequence of the highest-order sequence group and the sequence length of the bit sequences from the first sequence group to the $(\log_2(k))$-th sequence group.

The number of converting units from the first sequence group to the $(\log_2(k))$-th sequence group is $(2^{(\log(k))}-1)$.

The serial/parallel converting unit 40 outputs, to the multiplication unit 42 as a bit sequence of the highest-order sequence group, the most-significant bit sequence with a first sequence length included in the bit sequence input to the serial/parallel converting unit 40.

The serial/parallel converting unit 40 outputs, to the converting unit 410 as a bit sequence of the first sequence group, the second-significant bit sequence with a second sequence length included in the bit sequence input to the serial/parallel converting unit 40.

The serial/parallel converting unit 40 outputs, to the converting unit 411 as a first bit sequence of the second sequence group, the third-significant bit sequence with a third sequence length included in the bit sequence input to the serial/parallel converting unit 40. The serial/parallel converting unit 40 outputs, to the converting unit 412 as a second bit sequence of the second sequence group, the fourth-significant bit sequence with a fourth sequence length included in the bit sequence input to the serial/parallel converting unit 40.

In this manner, the serial/parallel converting unit 40 divides the bit sequence input to the serial/parallel converting unit 40 into the bit sequences from the highest-order sequence group and the first sequence group to the $(\log_2(k))$-th sequence group.

The converting unit 419 is an entropy conversion circuit converting a bit sequence input to the converting unit 419 into a bit sequence for which the probability of occurrence of 0 or a probability of occurrence of 1 is a predetermined probability of occurrence. The converting unit 419 performs, on the first bit sequence of the $(\log_2(k))$-th sequence group input to the converting unit 419, an entropy conversion in which the probability of occurrence of 0 or the probability of occurrence of 1 is changed. The converting unit 419 outputs, to the switching unit 421, the first bit sequence of the $(\log_2(k))$-th sequence group subjected to the entropy conversion.

The converting unit 420 is an entropy conversion circuit converting a bit sequence input to the converting unit 420 into a bit sequence for which the probability of occurrence of 0 or the probability of occurrence of 1 is a predetermined probability of occurrence. The converting unit 420 performs, on the (k/2)-th bit in the $(\log_2(k))$-th sequence group input to the converting unit 420, an entropy conversion in which the probability of occurrence of 0 or the probability of occurrence of 1 is changed. The converting unit 419 outputs, to the switching unit 421, the (k/2)-th bit sequence of the $(\log_2(k))$-th sequence group subjected to the entropy conversion.

The switching unit 421 acquires, from the converting unit 419 on a bit-by-bit basis, the first bit sequence of the $(\log_2(k))$-th sequence subjected to the entropy conversion and for which the probability of occurrence of 0 or the probability of occurrence of 1 has been adjusted. In a case where the bit in the first bit sequence of the $(\log_2(k))$-th sequence group subjected to the entropy conversion is 0, the switching unit 421 outputs, to the buffer 423, a symbol $S_1$, which is one of the candidates for the symbol for the optical signal to be transmitted. In a case where the bit in the first bit sequence of the $(\log_2(k))$-th sequence group subjected to the entropy conversion is 1, the switching unit 421 outputs, to the buffer 423, a symbol $S_2$, which is one of the candidates for the symbol for the optical signal to be transmitted. The buffer 423 includes a queue and outputs a symbol sequence on a FIFO basis.

The switching unit 422 acquires, from the converting unit 420, the (k/2)-th bit sequence of the $(\log_2(k))$-th sequence group subjected to the entropy conversion and for which the probability of occurrence of 0 or the probability of occurrence of 1 has been adjusted. In a case where the bit in the (k/2)-th bit sequence of the $(\log_2(k))$-th sequence group subjected to the entropy conversion is 0, the switching unit 422 outputs, to the buffer 424, a symbol $S_{k-1}$, which is one of the candidates for the symbol for the optical signal to be transmitted. In a case where the bit in the (k/2)-th bit sequence of the $(\log_2(k))$-th sequence group subjected to the entropy conversion is 1, the switching unit 421 outputs, to the buffer 424, a symbol $S_k$, which is one of the candidates for the symbol for the optical signal to be transmitted. The buffer 424 includes a queue and outputs a symbol sequence on a FIFO basis.

The candidate selecting unit 41 includes the switching unit 414, the switching unit 415, the buffer 416, the buffer 417, the switching unit 418, the switching unit 421, the switching unit 422, the buffer 423, and the buffer 424. The switching unit 414, the switching unit 415, the buffer 416, the buffer 417, and the switching unit 418 provide a configuration equivalent to the low-order bit selecting unit 413 illustrated in FIG. 2. The number of switching units from the first sequence group to the ($\log_2(k)$)-th sequence group is the same as the number of the converting units and is ($2^{(\log(k))}-1$).

In FIG. 15, the candidates for the symbol for the optical signal to be transmitted include k symbols from $S_1$ to $S_k$. In a case that the number of predetermined candidates for the symbol is k ($=2^n$), the candidate selecting unit 41 includes ($2^n-1$) converting units and ($2^n-1$) switching units. The converting units, the switching units, and the buffers illustrated in FIG. 15 operate similarly to the converting units, the switching units, and the buffers illustrated in FIG. 8.

The multiplication unit 42 acquires the bit sequence of the highest-order sequence group from the serial/parallel converting unit 40 on a bit-by-bit basis. The multiplication unit 42 acquires, from the switching unit 418, one symbol selected from the candidates for the symbol ($S_1$ to $S_k$) on a bit-by-bit basis for the bit sequence of the first sequence subjected to the entropy conversion.

In the second embodiment, the multiplication unit 42 multiplies a symbol code acquired by any number (complex number) in accordance with a bit sequence in the bit sequence of the highest-order sequence group. For example, in a case where the bit sequence in the bit sequence of the highest-order sequence group is "00", the multiplication unit 42 multiplies the code of the acquired symbol by a complex number (1+i). For example, in a case where the bit sequence in the bit sequence of the highest-order sequence group is "01", the multiplication unit 42 multiplies the code of the acquired symbol by a complex number (−1+i). For example, in a case where the bit sequence in the bit sequence of the highest order group is "11", the multiplication unit 42 multiplies the code of the acquired symbol by a complex number (−1−i). For example, in a case where the bit sequence in the bit sequence of the highest-order sequence group is "10", the multiplication unit 42 multiplies the code of the acquired symbol by a complex number (1−i). The multiplication unit 42 outputs, to the transmission unit 5, the result of multiplication of the code of the symbol by any number.

Note that the modulation unit 4 can deal with a case where, for example, the numbers of the converting units and the switching units included in the modulation unit 4 are each adjusted to a number that is not a "power of 2" to make the number of predetermined candidates for the symbol different from a "power of 2". Additionally, the modulation unit 4 can deal with a case in which converting unit(s) and switching unit(s) of the plurality of converting units and the plurality of switching units included in the modulation unit 4 are used to make the number of predetermined candidates for the symbol different from a "power of 2".

Figure 16:
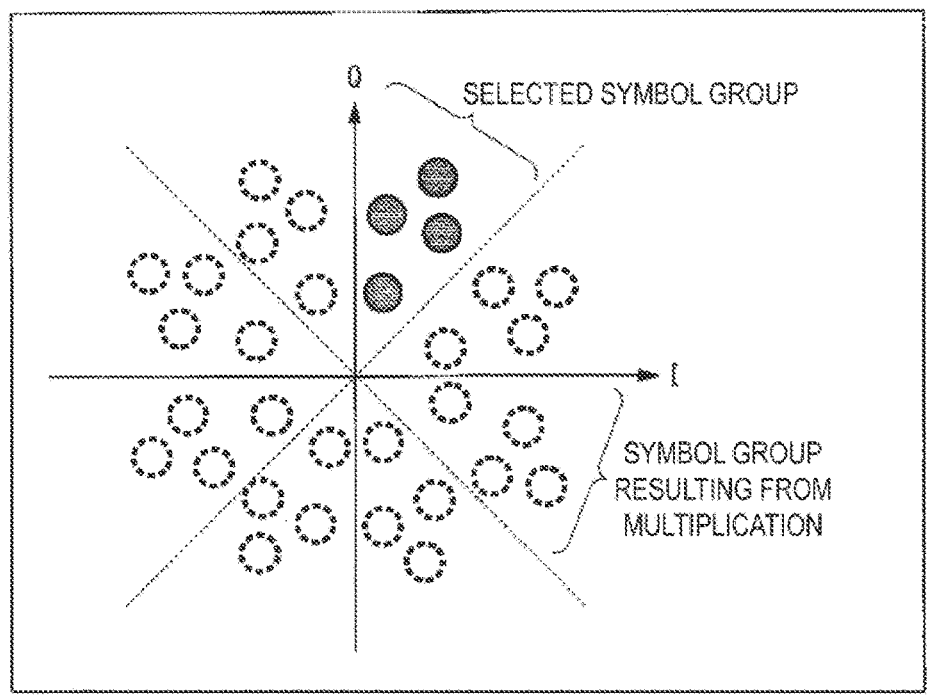
FIG. 16 is a diagram illustrating an example of an arbitrarily selected symbol group and a symbol group resulting from multiplication according to the second embodiment.

FIG. 16 is a diagram illustrating an example of an arbitrarily selected symbol group and a symbol group resulting from multiplication. The modulation unit 4 may select a symbol from any plurality of candidates for the symbol in the IQ plane. The multiplication unit 42 may multiply an output from the candidate selecting unit 41 by any number (complex number). In FIG. 16, the shape of a constellation (signal space diagram) in a two-dimensional complex plane (IQ plane) is not limited to a lattice shape (square) like a constellation in 64 QAM or the like.

Figure 17:
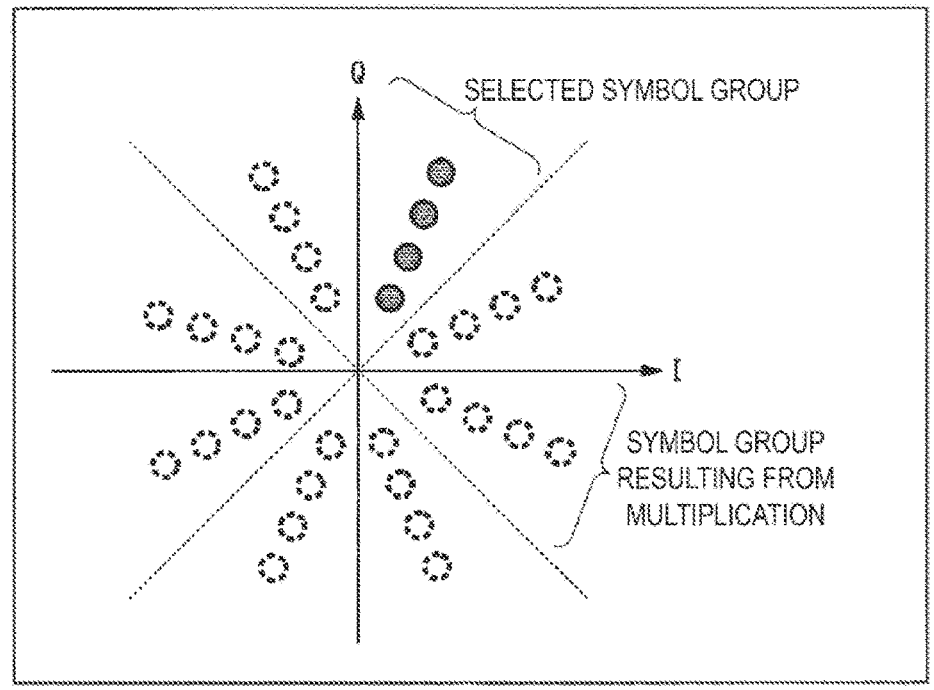
FIG. 17 is a diagram illustrating an example of a symbol group selected in an amplitude direction and a symbol group resulting from multiplication according to the second embodiment.
Figure 18:
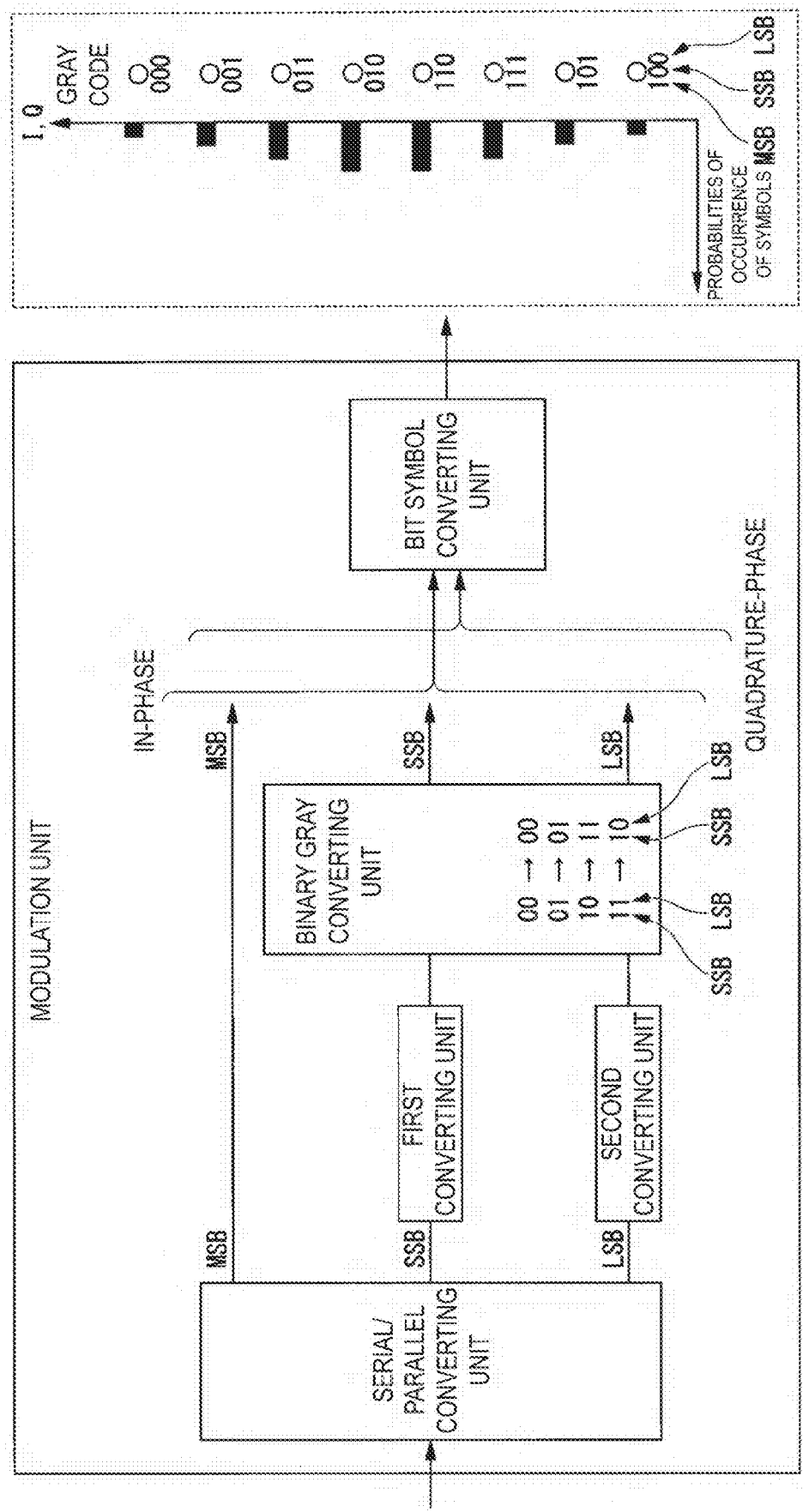
FIG. 18 is a diagram illustrating an example of a configuration of a modulation unit of an optical transmitter in the related art.
Figure 19:
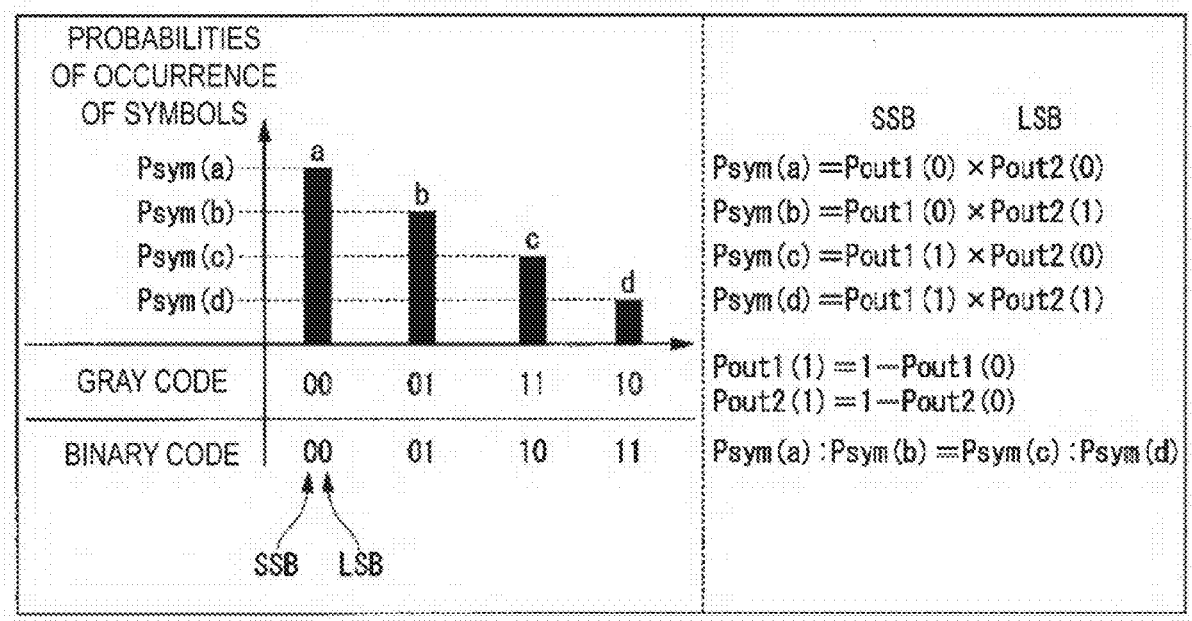
FIG. 19 is a diagram illustrating an example of a relationship between gray codes of symbols and the probabilities of occurrence of the symbols in the related art.

FIG. 17 is a diagram illustrating an example of a symbol group selected in the amplitude direction and a symbol group resulting from multiplication. The modulation unit 4 may select a symbol from a plurality of symbols in the IQ plane in the amplitude direction (real numbers). The multiplication unit 42 may multiply an output from the candidate selecting unit 41 by any number (complex number). In FIG. 17, the shape of the constellation (signal space diagram) in the two-dimensional complex plane (IQ plane) is radial.

As described above, the optical communication system 1 according to the second embodiment includes the optical transmitter 2 and the optical receiver 3. The optical transmitter 2 includes the serial/parallel converting unit 40, the converting units the number ($2^{(\log(k))}-1$) of which corresponds to a logarithmic value for the number (k) of candidates for the symbol having different probabilities of occurrence, the selecting units (switching units) the number of which is the same as the number of the converting units, the multiplication unit 42, and the transmission unit 5.

The serial/parallel converting unit 40 outputs the bit sequences of the sequence groups the number ($\log_2(k)$) of which is determined by the logarithmic value for the number (k) of the candidates, and the bit sequence of the highest-order sequence group. The converting unit converts the bit sequence of the sequences group input to the converting unit into a bit sequence for which the probability of occurrence of 0 or the probability of occurrence of 1 is a predetermined probability of occurrence. The selecting unit acquires a bit sequence for which the probability of occurrence is converted by the converting unit higher in order than the selecting unit. The selecting unit selects, in accordance with the bit sequence acquired, an order of output of the symbols to the other selecting units in the sequence groups higher in order than the selecting unit. The multiplication unit 42 multiplies, by a number, a value representing a symbol selected by the switching unit 418 corresponding to the highest-order selecting unit, in accordance with the bit sequence of the highest-order sequence group. The transmission unit 5 transmits an optical signal based on the result of multiplication of a complex number. The optical receiver 3 includes the reception unit 6 and the demodulation unit 7. The reception unit 6 receives the optical signal. The demodulation unit 7 performs demodulation processing on an electrical signal generated in accordance with the received optical signal.

As described above, the optical communication system 1 can arbitrarily adjust the probabilities of occurrence of symbols by using a simple configuration. The optical communication system 1 can suppress the transmission power of the optical signal.

The optical transmitter 2 may include the two modulation units 4 (two modulators) each including the converting unit (a converter), the selecting unit (switching unit), and the multiplication unit 42, the imaginary-number converting unit 44, and the multiplexing unit 45. The imaginary-number converting unit 44 (an imaginary-number converter) converts, into a sequence of symbols of imaginary numbers, a sequence of symbols of real numbers output from the modulation unit 4-2. The multiplexing unit 45 (a multiplexer) multiplexes the sequence of the symbols of real numbers output from the modulation unit 4-1 and the sequence of symbols of imaginary numbers output from the imaginary-number converting unit 44.

The embodiments of the present disclosure have been described above in detail with reference to the drawings. However, specific configurations are not limited to those embodiments, and include any design or the like within the scope not departing from the gist of the present disclosure.

For example, the optical transmitter 2 and the optical receiver 3 may store computer programs and code tables in a non-volatile storage device (non-transitory recording medium) such as a flash memory. At least some of the functions of the optical transmitter 2 and the optical receiver 3 may be implemented by software. The multiplication unit 42 may store a data table for multiplication processing. The data table may be, for example, a table representing the correspondence between non-multiplied complex numbers and multiplied complex numbers.

REFERENCE SIGNS LIST

1 Optical communication system
2 Optical transmitter
3 Optical receiver
4 Modulation unit
4a Symbol mapping unit
5 Transmission unit
5a Symbol demapping unit
6 Reception unit
7 Demodulation unit
40 Serial/parallel converting unit
40b Serial/parallel converting unit
41 Candidate selecting unit
42 Multiplication unit
43 Bit symbol converting unit
44 Imaginary-number converting unit
45 Multiplexing unit
70 Division unit
71 Generation unit
72 Parallel/serial converting unit
72a Parallel/serial converting unit
73 Symbol bit converting unit
74 Real-part extracting unit
75 Imaginary-part extracting unit
410 Converting unit
411 Converting unit
412 Converting unit
413 Low-order bit selecting unit
414 Switching unit
415 Switching unit
416 Buffer unit
417 Buffer unit
418 Switching unit
500 Signal line
501 Signal line
502 Signal line
503 Signal line
600 Storage unit
710 Converting unit
711 Converting unit
712 Converting unit
713 Low-order bit selecting unit
800 Signal line
801 Signal line
802 Signal line
803 Signal line

The invention claimed is:

1. An optical communication system comprising an optical transmitter and an optical receiver,
wherein the optical transmitter includes
a serial/parallel converter, entropy converters and selectors a numbers of which correspond to a logarithmic value for a number of candidates for a symbol having different probabilities of occurrence, a multiplier, and a signal transmitter,
the serial/parallel converter outputs bit sequences of sequence groups a number of which is determined by the logarithmic value and a bit sequence of a highest-order sequence group,
each of the entropy converters converts the bit sequence of the sequence group input to a bit sequence for which a probability of occurrence of zero (0) or a probability of occurrence of one (1) is a predetermined probability of occurrence,
each of the selectors acquires a bit sequence for which the probability of occurrence is converted by the entropy converter higher in order than the entropy converter for the selector, and selects an order of output of the symbol to other selectors in the sequence groups higher in order than the selector in accordance with the acquired bit sequence,
the multiplier multiplies a value representing the symbol selected by a highest-order selector of the selectors, by a number, in accordance with the bit sequence of the highest order sequence group,
the signal transmitter transmits an optical signal based on a result of the multiplication by the number,
the optical receiver includes a signal receiver and a demodulator,
the signal receiver receives the optical signal, and
the demodulator performs demodulation processing on an electrical signal generated in accordance with the received optical signal.

2. The optical communication system according to claim 1, wherein
the optical transmitter includes two modulators each including the converter, the selector, and the multiplier, an imaginary-number converter, and a multiplexer,
the imaginary-number converter converts a sequence of a symbols of real numbers output from a first modulator of the modulators into a sequence of a symbols of imaginary numbers, and
the multiplexer multiplexes a sequence of a symbols of real numbers output from a second modulator of the modulators and the sequence of a symbols of imaginary numbers.

3. An optical transmitter comprising a serial/parallel converter, entropy converters and selectors a numbers of which correspond to a logarithmic value for a number of candidates for a symbol having different probabilities of occurrence, a multiplier, and a signal transmitter,
wherein the serial/parallel converter outputs bit sequences of sequence groups a number of which is determined by the logarithmic value and a bit sequence of a highest-order sequence group,
each of the entropy converters converts the bit sequence of the sequence group input to a bit sequence for which a probability of occurrence of zero (0) or a probability of occurrence of one (1) is a predetermined probability of occurrence,
each of the selectors acquires a bit sequence for which the probability of occurrence is converted by the entropy converter higher in order than the entropy converter for the selector, and selects an order of output of the symbol to other selectors in the sequence groups higher in order than the selector in accordance with the acquired bit sequence,
the multiplier multiplies a value representing the symbol selected by a highest-order selector of the selectors, by a number, in accordance with the bit sequence of the highest order sequence group, and the signal transmitter transmits an optical signal based on a result of the multiplication by the number.

4. The optical transmitter according to claim 3, comprising two modulators each including the entropy converter, the selector, and the multiplier, an imaginary-number converter, and a multiplexer,
- wherein the imaginary-number converter converts a sequence of a symbols of real numbers output from a first modulator of the modulators into a sequence of a symbols of imaginary numbers, and
- the multiplexer multiplexes a sequence of a symbols of real numbers output from a second modulator of the modulators and the sequence of a symbols of imaginary numbers.

5. The optical transmitter according to claim 3, wherein the selector selects a symbol for an optical signal to be transmitted from a plurality of candidates for the symbol arranged in a two-dimensional complex plane in an amplitude direction.

6. The optical transmitter according to claim 3, wherein the multiplier multiplies, by a real number, a value representing the symbol for the optical signal to be transmitted.

7. An optical receiver comprising:
- a signal receiver configured to receive an optical signal transmitted from the optical transmitter according to claim 3; and
- a demodulator configured to perform demodulation processing on an electrical signal generated in accordance with the optical signal.

* * * * *